United States Patent [19]

Lombardi

[11] Patent Number: 4,470,092
[45] Date of Patent: Sep. 4, 1984

[54] PROGRAMMABLE MOTOR PROTECTOR

[75] Inventor: Steven A. Lombardi, Greendale, Wis.

[73] Assignee: Allen-Bradley Company, Milwaukee, Wis.

[21] Appl. No.: 423,793

[22] Filed: Sep. 27, 1982

[51] Int. Cl.³ .................... H02H 5/04; H02H 7/08; G01R 19/00; G01R 21/00
[52] U.S. Cl. .................................. 361/23; 364/483
[58] Field of Search ................ 364/483; 361/23, 25, 361/31

[56] References Cited

U.S. PATENT DOCUMENTS

| | | | |
|---|---|---|---|
| 3,838,314 | 9/1974 | Boothman et al. | 317/48 |
| 3,845,354 | 10/1974 | Boothman et al. | 317/13 B |
| 3,848,160 | 11/1974 | Boothman et al. | 317/27 R |
| 4,319,298 | 3/1982 | Davis et al. | 361/27 X |
| 4,377,836 | 3/1983 | Elms et al. | 364/483 |

FOREIGN PATENT DOCUMENTS

| | | | |
|---|---|---|---|
| 962333 | 2/1975 | Canada | 324/17 |
| 983094 | 2/1976 | Canada | 318/50 |

OTHER PUBLICATIONS

Brochure-General Electric-"Lodtrak II".

*Primary Examiner*—Harry E. Moose, Jr.
*Assistant Examiner*—Patrick W. Foster
*Attorney, Agent, or Firm*—Barry E. Sammons

[57] ABSTRACT

A programmable motor protector includes a protect module which connects through one serial link to a programmer module and through a second serial link to an RTD module. The protect module is a microprocessor which is programmed to monitor the values of various motor operating parameters and compare them against alarm limits and trip limits which are entered through the programmer module. In addition to indicating a trip or alarm condition, the system saves in a diagnostic table an image of the motor operating conditions at the moment a trip is detected. This diagnostic table may be examined using the programmer module.

6 Claims, 21 Drawing Figures

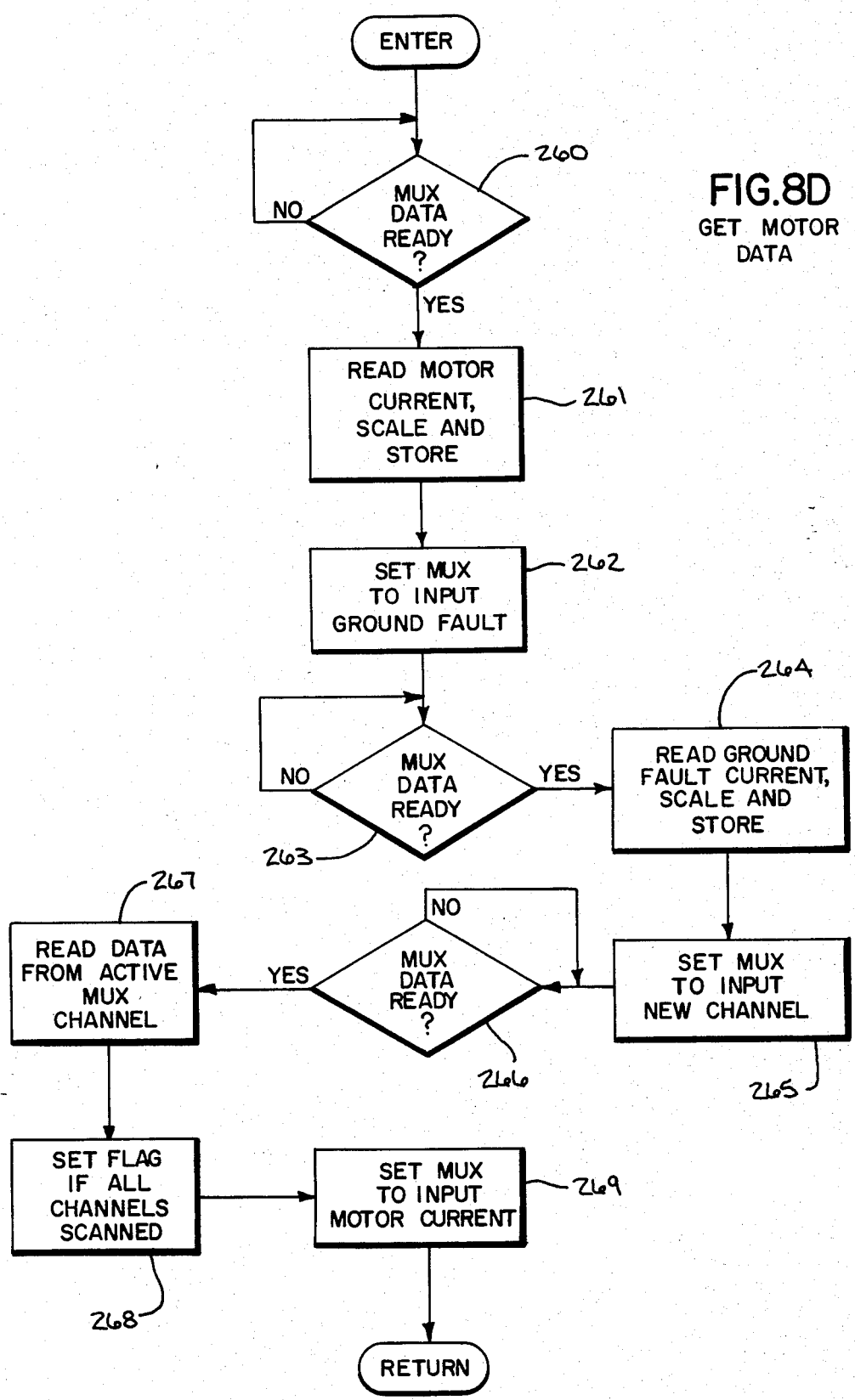

DETERMINE DEVICE OUTPUT

GET RTD DATA

SAVE TRIP CONDITIONS

CHECK GROUND FAULT

PROGRAMMABLE MOTOR PROTECTOR

BACKGROUND OF THE INVENTION

The field of the invention is motor protection circuits for minimizing motor damage due to overheating, ground faults or bearing failure.

There are numerous commercially available circuits and devices for detecting potentially damaging conditions for motors employed in industrial applications. These include, for example, circuits for detecting phase imbalances as disclosed in U.S. Pat. No. 3,736,470; circuits for detecting ground fault conditions as disclosed in U.S. Pat. No. 3,968,409; and overload relays such as that disclosed in U.S. Pat. No. 4,157,523. In large motor controls such as that disclosed in U.S. Pat. No. 3,896,353, such circuits and devices, operate to shut down the motor when potentially damaging conditions are sensed. Such motor protection systems are often custom built for each application, and once delivered, the user has limited ability to alter the conditions, or operating parameters, which will shut the motor down.

Although programmable devices have become available which enable the user to preset the trip levels of various operating parameters, such devices are costly and have limited diagnostic capabilities.

SUMMARY OF THE INVENTION

The present invention relates to a programmable motor protector which enables the user to program the trip points for various operating parameters, and which stores the values of these parameters for subsequent diagnostic purposes at the moment a trip point is exceeded. More particularly, the programmable motor protector includes an input image table storage which contains the present values of the motor operating parameters and these are compared with trip values stored in a user entry table storage. When a trip value is exceeded, not only is a trip condition indicated, but also, the content of the input image table storage is transferred to a diagnostic table storage.

A general object of the invention is to provide a diagnostic capability which will assist the user in diagnosing motor faults. A "snapshot" of the motor operating parameters at the moment a trip condition occurs is saved in the diagnostic table. These values can be accessed with a programmer module which displays selected parameters.

Another general object of the invention is to provide a modular system which enables components to be conveniently located. A protect module houses the main processor and the input circuits which sense a variety of motor operating parameters. A separate RTD module connects to the protect module through a serial communication link. The RTD module monitors resistance temperature detectors mounted in the motor and provides temperature data when requested by the protect module.

A more specific object of the invention is to provide extensive information to the user through a programmer module. The programmer module communicates with the protect module through a serial communications link, and in addition to entry of trip and alarm level data into the user entry table, the programmer module may be employed to enter a scan list. The scan list indicates those motor operating parameters which are to be displayed at the programmer module while the motor is operating normally.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIGS. 8A–8H are flow charts of the programs executed by the microprocessor which forms part of the circuit of FIG. 2;

and

Figure 4:
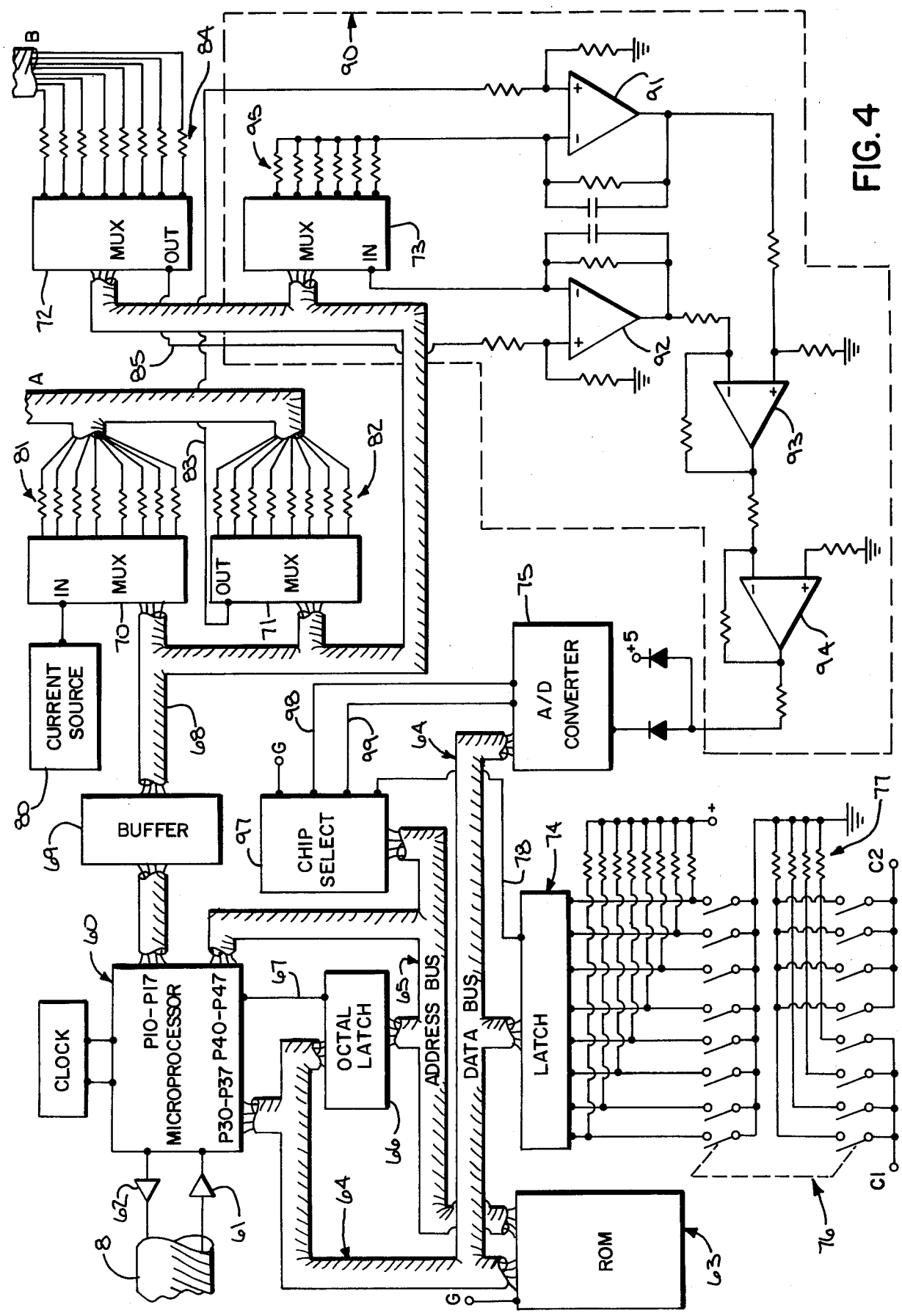
FIG. 4 is an electrical schematic diagram of the RTD module which forms part of the system of FIG. 1.
Figure 9:
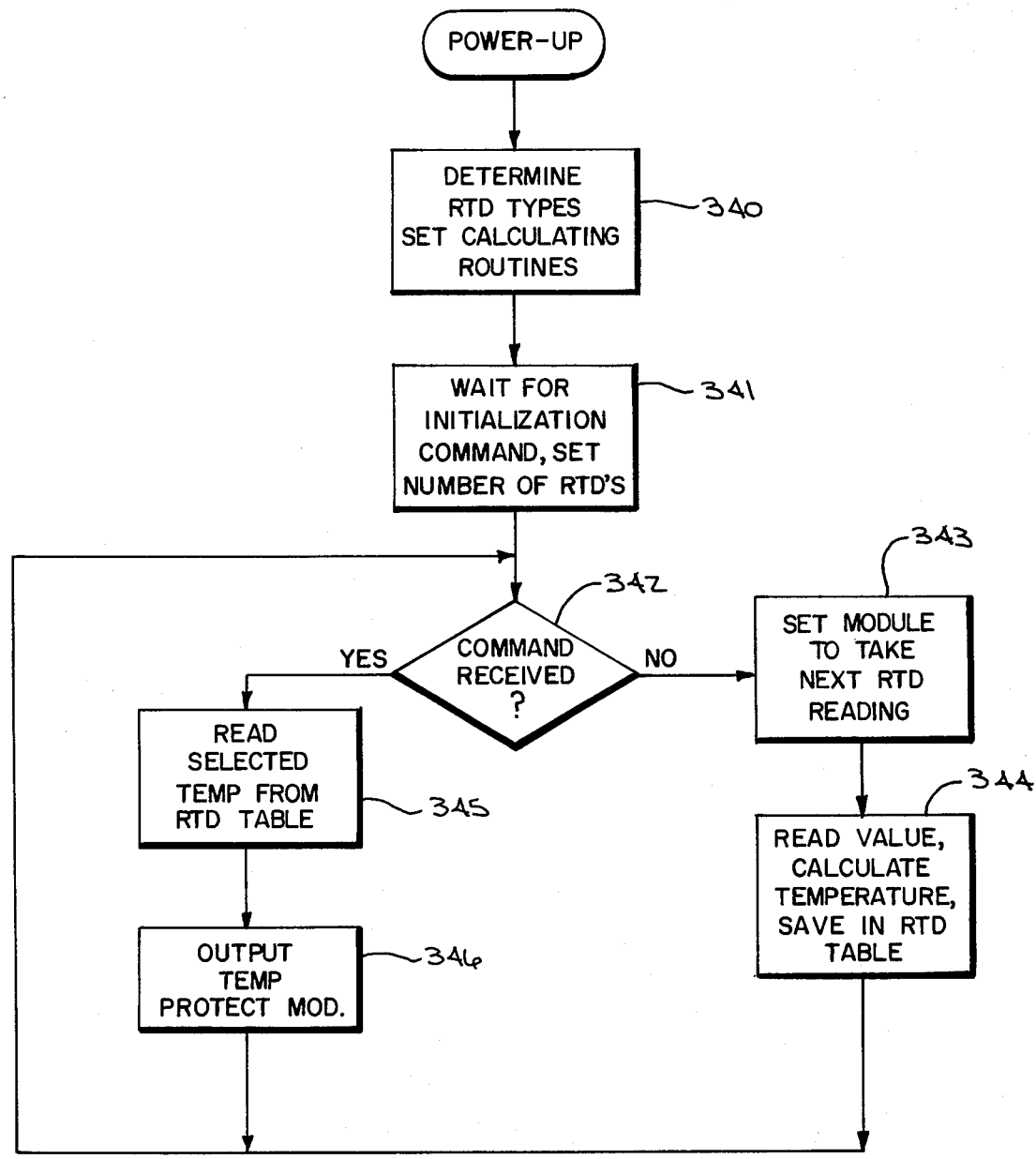

FIG. 9 is a flow chart of the programs executed by the microprocessor which forms part of the circuit of FIG. 4.

DESCRIPTION OF THE PREFERRED EMBODIMENT

Figure 1:
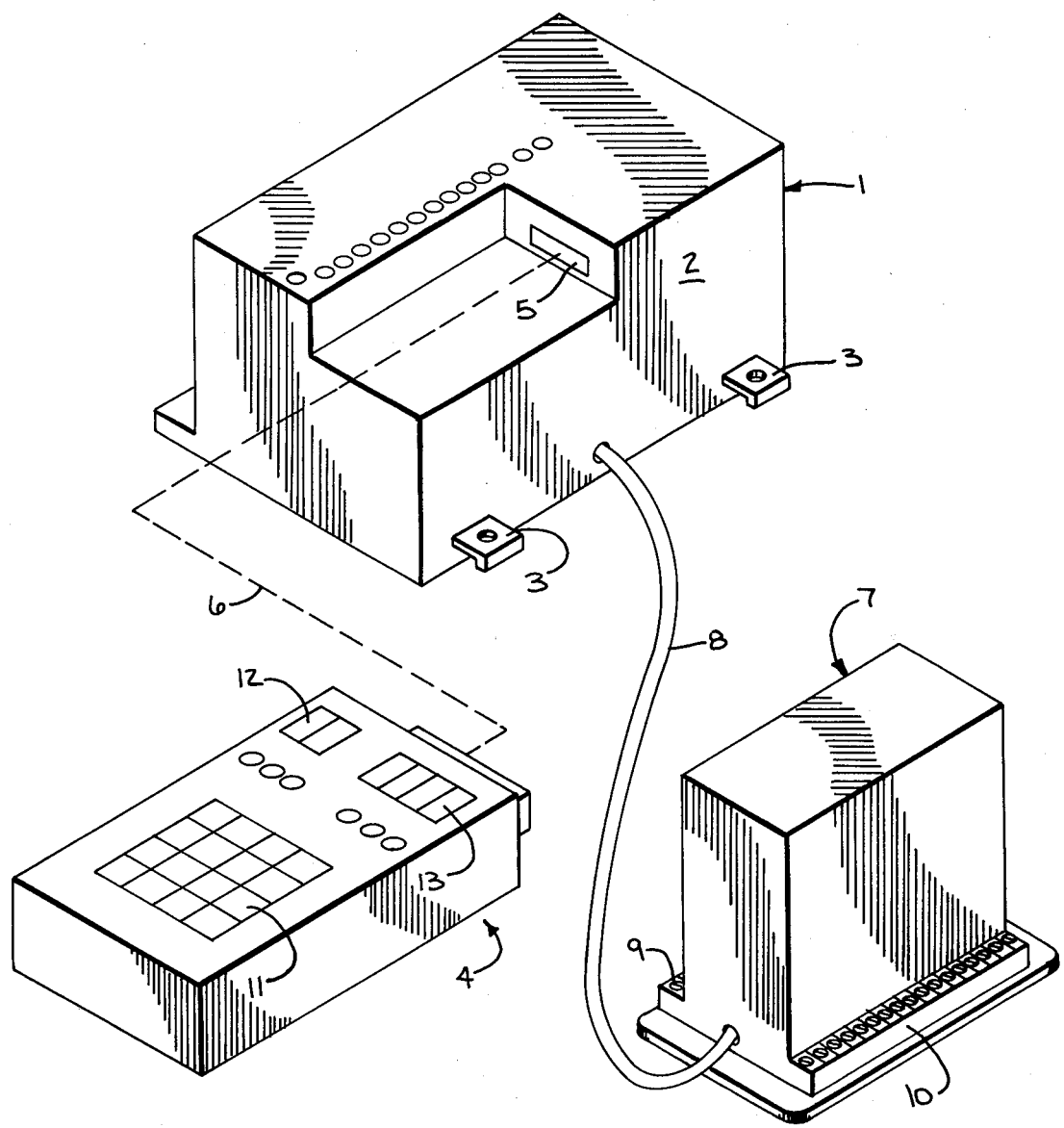
FIG. 1 is a perspective view of the programmable motor protector of the present invention.

Referring particularly to FIG. 1, the programmable motor protector system includes a protective module 1 which is enclosed in a metal housing 2 having a set of mounting brackets 3. The protective module 1 is typically mounted to the back wall of a much larger enclosure which contains other elements of a motor drive, such as fuses, line contactors and current transformers.

A rectangular recess is formed in the front of the protective module housing 2 and a programmer module 4 is received in this recess. The programmer module 4 engages a connector 5 which is exposed through an opening in the housing 2 to make electrical connection between the two modules 1 and 4. As indicated by dashed line 6, the programmer unit 4 may also be removed from the recess and operated from a remote location. In such case, a cable is employed to make the electrical connection between the two modules 1 and 4. It is contemplated that the programmer module 4 may thus be conveniently located, as for example, on the door of the enclosure which houses the motor control and protective module 1.

Also housed separately is an RTD module 7 which is connected to the protective module 1 by a cable 8. The RTD module includes terminal strips 9 and 10 along its opposing back edges and these are employed to connect the module 7 to various sensors in the motor which is being protected.

The primary objective of the programmable motor protector is to prevent motor damage due to overheating, ground faults or bearing failure. This is achieved by sensing the motor stator-winding temperature, motor current, ground fault current, line voltage and bearing temperature. These sensed parameters are input directly to the protective module 1 and through the RTD module 7, and they are compared to corresponding limits entered into the protective module 1 using the programmer module 4. If any of the sensed parameters exceed the programmed limits, an alarm or trip is signaled and an appropriate output relay may be tripped. In addition, the motor status data at the moment the trip limit was exceeded is stored for diagnostic purposes.

Referring still to FIG. 1, the limiting values which establish the alarm and trip levels for the various motor operating parameters are entered through a sixteen key keyboard 11 on the programmer module 4. The system is programmed by entering a two-digit function number, followed by one to four decimal digits. The function number is displayed on a two digit display 12 and the associated data is displayed on a four digit display 13. Table A is a list of the function numbers and their description.

TABLE A

| Function No. | Description |
| --- | --- |
| 1 | Current transformer primary rating in amps (25-1500). |
| 2 | Full-load current (FLA) in amps (15-800). |
| 3 | Locked-rotor current in amps (30-9999). |
| 4 | Line voltage in volts (208-7200). |
| 5 | Number of winding RTD's (0-6). |
| 6 | Number of bearing RTD's (0-2). |
| 7 | Allowable stall time in seconds (1-30). |
| 8 | Allowable acceleration time in seconds (1-60). |
| 9 | Allowable starts/time increment (0-10). |
| 10 | Time increment for repeated starts (1-16). |
| 11 | Phase unbalance trip current as percent of FLA (5-30). |
| 12 | Phase reversal protect (1 = enable). |
| 13 | Undervoltage trip as percent of line voltage (75-95). |
| 14 | Undervoltage trip delay in seconds (0-10). |
| 15 | Ground-fault transformer rating in amps (5-1000). |
| 16 | Ground-fault alarm current in amps (1-25). |
| 17 | Ground-fault trip current in amps (1-25). |
| 18 | Ground-fault trip delay in msecs. (100-9999). |
| 19 | Trip current as a multiple of FLA (5-15). |
| 20 | Jam trip current as a multiple of FLA (2-10). |
| 21 | Excessive fault trip current inhibit (1 = enable). |
| 22 | Underload trip current as percent FLA (50-90). |
| 23 | Underload trip time delay in seconds (1-10). |
| 24 | Ultimate trip current as percent of FLA (100-125). |
| 25 | Winding alarm temperature (20-180). |
| 26 | Winding trip temperature (20-180). |
| 27 | Bearing alarm temperature (20-180). |
| 28 | Bearing trip temperature (20-180). |
| 29 | Reset condition (1 = auto, 2 = manual). |
| 30 | Access code (0-9999). |
| 31 |  |
| 32 | Scan list entries (40-60). |
| 33 | Scan display time/function in seconds (3-10). |

TABLE A-continued

| Present Value | Trip Value | |
| --- | --- | --- |
| 40 | 70 | Maximum winding RTD temperature in degrees C. |
| 41 | 71 | Winding temperature RTDW1 in degrees C. |
| 42 | 72 | Winding temperature RTDW2 in degrees C. |
| 43 | 73 | Winding temperature RTDW3 in degrees C. |
| 44 | 74 | Winding temperature RTDW4 in degrees C. |
| 45 | 75 | Winding temperature RTDW5 in degrees C. |
| 46 | 76 | Winding temperature RTDW6 in degrees C. |
| 47 | 77 | Bearing temperature RTDB1 in degrees C. |
| 48 | 78 | Bearing temperature RTDB2 in degrees C. |
| 49 | 79 | Line 1 current in amps |
| 50 | 80 | Line 2 current in amps |
| 51 | 81 | Line 3 current in amps |
| 52 | 82 | Line 1 - Line 2 volts |
| 53 | 83 | Line 2 - Line 3 volts |
| 54 | 84 | Line 3 - Line 1 volts |
| 55 | 85 | Ground-fault current in amps |
| 56 | 86 | Available motor starts |

Figure 2A:
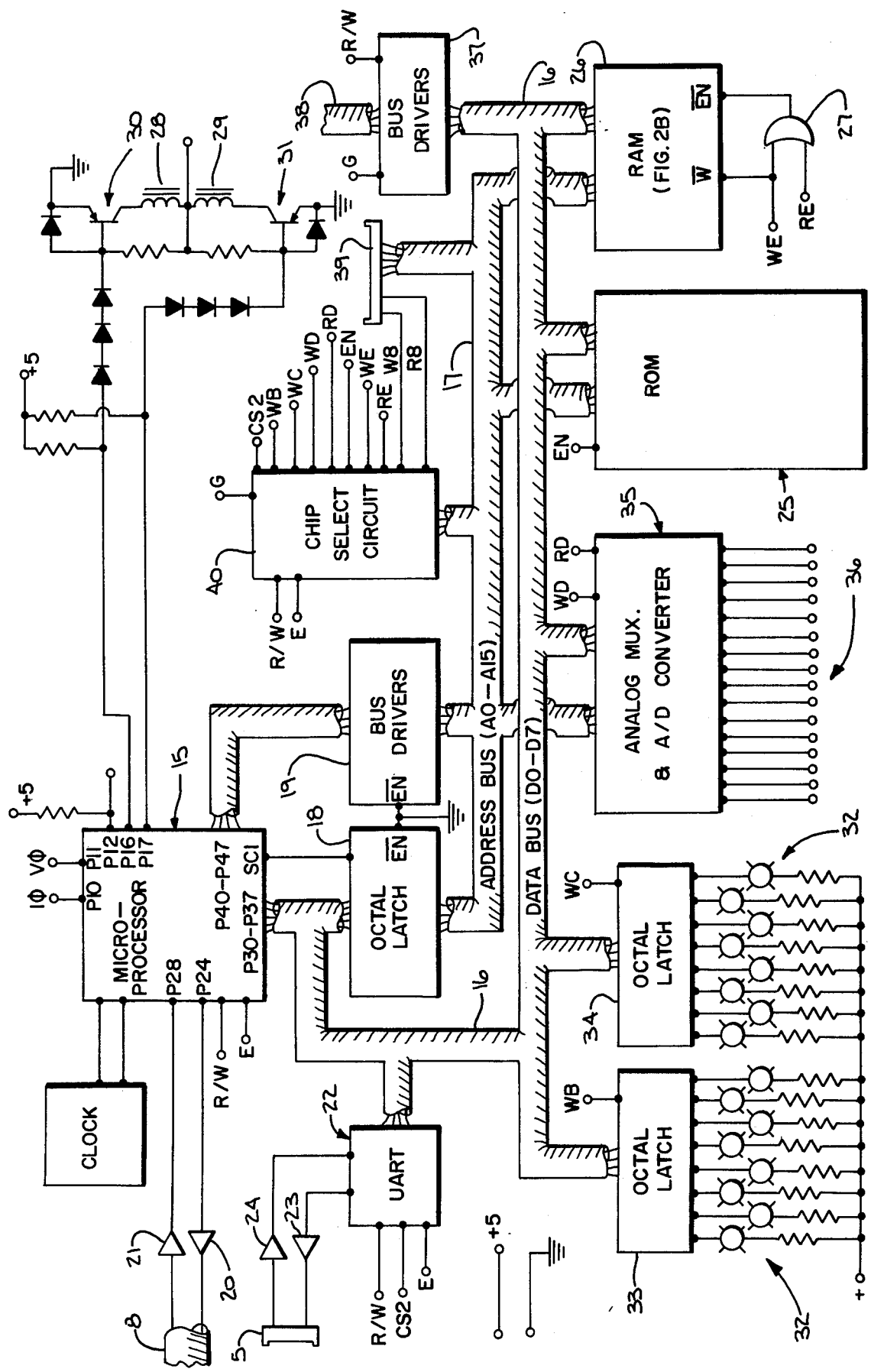
FIG. 2A is an electrical schematic diagram of the protective module which forms part of the system of FIG. 1.

Referring particularly to FIG. 2A, the protective module 1 is a microprocessor-based system which is structured about an 8-bit microprocessor 15 which drives an 8-bit data bus 16 and a 16-bit address bus 17. A model 6803 microprocessor 15 is employed and the data bus 16 connects to its input/output leads P30-P37. An octal latch 18 also connects to the leads P30-P37, and when the microprocessor 15 generates a least significant address byte, it is stored in the latch 18 for later application to the address bus 17. The most significant address byte is generated at microprocessor leads P40-P47 which connect to bus drivers 19. The bus drivers 19 apply this address byte to leads A8-A15 in the address bus 17, and at the same time the lower address byte is applied to leads A0-A7 by the latch 18. As determined by a read/write control line (R/W), a byte of data is then either read into the microprocessor 15 through the data bus 16, or written to an addressed device connected to the data bus 16.

The microprocessor 15 contains a universal asynchronous receiver/transmitter which outputs serial data at a port P24 and which inputs serial data at a port P23. Buffers 20 and 21 couple these serial ports to the cable 8 leading to the RTD module 7 and to provide signal level changes to conform to the RS422 standard protocol. A separate universal asynchronous receiver/transmitter (UART) 22 connects to the data bus 16 to provide a second serial port. It is coupled to the connector 5 by buffers 23 and 24. A byte of data is output serially through the connector 5 when the UART 22 is enabled by control lines "CS2" and "E" and the R/W control line is driven low. A byte of data which is received serially from the programmer module 4 is read into the microprocessor 15 when the UART 22 is enabled and the R/W control line is at a logic high voltage. Serial communications with both the RTD module 7 and the programmer module 4 is thus accomplished and is under the control of the microprocessor 15.

The microprocessor 15 operates in response to machine instructions which are stored as programs in a read-only memory (ROM) 25. These instructions are read from the ROM 25 in sequence and executed by the microprocessor 15 to carry out the functions of the programmable motor protector. These programs and the manner in which the microprocessor 15 executes them will be described in more detail below.

Figure 2B:
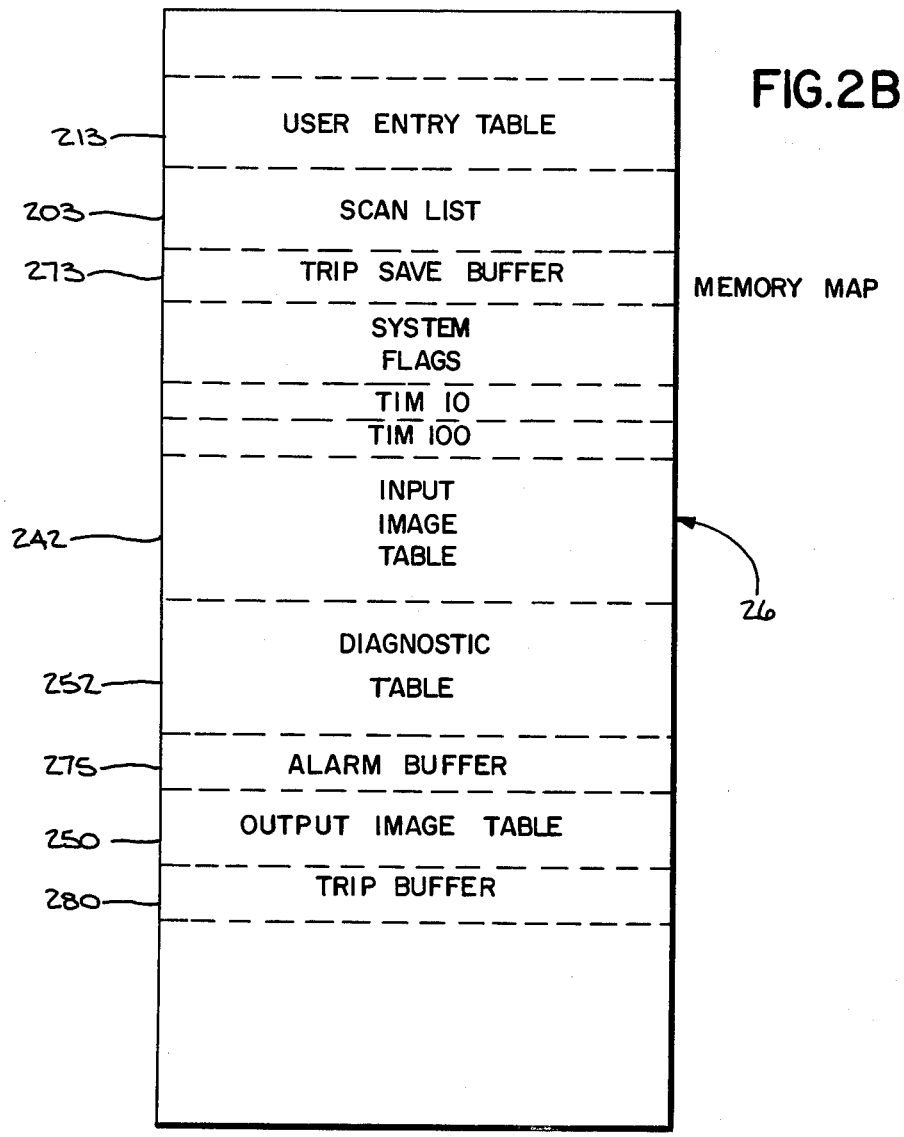
FIG. 2B is a memory map os the RAM memory which forms part of the circuit of FIG. 2A.

Data which is input from the various devices coupled to the data bus 16 is stored in a random-access memory (RAM) 26. Data may be written to or read from the RAM 25 when it is enabled by an OR gate 27. The state of a WE control line determines whether a read or write operation is being performed. Along with input data, the RAM 26 stores data which is generated during the execution of the programs stored in the ROM 25 and which is output to various devices coupled to the data bus 16. As will be described in more detail below, the RAM 26 also stores the values of the various motor parameters being monitored by the system, and these are available for diagnostic purposes following an alarm or shut down. FIG. 2B is a map of the RAM 26 which shows some of these data structures.

Referring still to FIG. 2A, when a preprogrammed limit is exceeded, either an "alarm" relay 28 is de-energized or a "trip" relay 29 is de-energized. The relays 28 and 29 are driven by respective transistor circuits 30 and 31, which in turn are controlled by output terminals P16 and P17 on the microprocessor 15. When such an alarm or trip occurs, one of sixteen light emitting diodes (LEDS) 32 is also energized to provide a visual indication of the cause. The LEDS 32 are connected to respective output terminals on a pair of octal latches 33 and 34 and the inputs to the latches 33 and 34 are driven by the data bus 16. An eight-bit word can be written to either latch 33 or 34 by the microprocessor 15 when respective enable lines WB or WC are driven low.

Also connected to the data bus 16 is an analog multiplexer and analog-to-digital converter circuit 35. The circuit 35 is a commercially available integrated circuit which inputs an analog signal from one of sixteen input leads 36 and converts it to a digital number. The input selection is made by leads A0-A3 in the address bus 17 when a WD control line is driven low, and the resulting digital number is read from the circuit 35 onto the data bus 16 when an RD control line is driven low. As will be described in more detail below, the analog input signals to the circuit 35 are derived from a number of different sources, including signals indicative of phase voltages and currents applied to the motor being protected.

The data bus 16 and address bus 17 extend to an instrumentation circuit which forms part of the protective module 1. Referring still to FIG. 2A, a bus driver circuit 37 connects to the leads in the data bus 16 and provides a bidirectional linkage to a backplane data bus 38. Data is coupled through the bus drivers 37 when a G control line is driven low and the direction of data flow is determined by the R/W control line. The octal latch 18 and bus drivers 19 provide sufficient buffering for the address bus 17 which is shown connected to the backplane through a connector 39.

The operation of nearly all circuit elements connected to the data bus 16 is determined by the address on the bus 17 and the state of the miroprocessor control lines E and R/W. A chip select circuit 40 connects to the address bus 17 as well as the microprocessor's R/W and E control lines, and the chip select circuit drives the appropriate device control line low when that device's address appears on the address bus 17. Table B is a map of the address space defined by the chip select circuit 40.

TABLE B

| Address (Hexadecimal) | R/W | Description |
| --- | --- | --- |
| A000 | 1/0 | read or write to UART 22 |
| E000 | 0 | write to latch 33 |
| F000 | 0 | write to latch 34 |
| C000-C00F | 1 | read digital output of analog multiplexer 35 |
| C000-C00F | 0 | select analog multiplexer channel |
| E000-FFFF | 1 | read data from ROM 25 |
| D000-D7FF | 1/0 | read or write to RAM 26 |
| 8000-9FFF | 1/0 | enable bus drivers 37 |
| B000-BFFF | 1 | enable bus drivers 37 |

Referring particularly to FIGS. 2A and 6, most of the analog input signals to the analog multiplexer circuit 35 are generated by a set of input circuits which receive signals directly from the motor control circuit and apply the signals to respective ones of the inputs 36. Under the direction of the microprocessor 15, these analog input signals are selectively converted to digital numbers and read into the microprocessor 15 through the analog multiplexer circuit 35. These digital numbers are stored in the RAM 26 for comparison with the preset limits.

Three of the analog input signals to the circuit 35 are indicative of the magnitude of the motor phase voltages (VSAB, VSBC, VSCA). As shown in FIG. 6A with respect to phase voltage VSAB, the a.c. input waveform, VSAB, is amplified and rectified by a circuit which includes an operational amplifier 120. This rectified waveform is applied to a 0-5 volt amplifier circuit 121 which operates as an integrator to produce a voltage level between zero and five volts. The output voltage level, VAB, is indicative of the phase voltage applied to the motor and it is suitable for application to an input 36 on the analog multiplexer circuit 35. Similar analog input signals, VBC and VCA, are generated for the other two phases using identical circuitry.

Six separate analog input signals indicative of motor phase currents are applied to inputs 36 on the analog multiplexer circuit 35. Referring particularly to FIG. 6B, an a.c. voltage waveform for one phase current (ISA) is applied to a rectifier and amplifier circuit 122. The output signal is further amplified by a circuit which includes operational amplifier 123 and the resulting analog signal is applied to the inputs of two 0-5 volt amplifiers 124 and 125. The amplifiers 124 and 125 are the same as the amplifier 121 described above, except their gains are selected to provide different current sensitivities. The amplifier 124 provides a five volt output level when the armature current equals 200% to 400% of full load current, and the amplifier 125 provides a five volt output when armature current equals 1500% to 3000%. Identical circuits to that illustrated in FIG. 6B are provided for each of the other current phases, ISB and ISC.

A single analog input signal is applied to the analog multiplexer 35 to indicate the level of ground fault current. Referring particularly to FIG. 6C, two input signals (ISF) from a zero sequence transformer (not shown in the drawings) are applied to respective input circuits 126 and 127. Each input circuit 126 and 127 includes a pair of operational amplifiers 128 and 129 which are connected to receive the input signal, ISF from the secondary winding of a ground fault current transformer. The resulting output signals are summed and applied to the input of a 0-5 volt amplifier 130 similar to that described above. The output signal, IFLT, is proportional to the magnitude of the ground fault current and it is applied directly to an input 36 on the analog multiplexer 35.

Figure 6E:
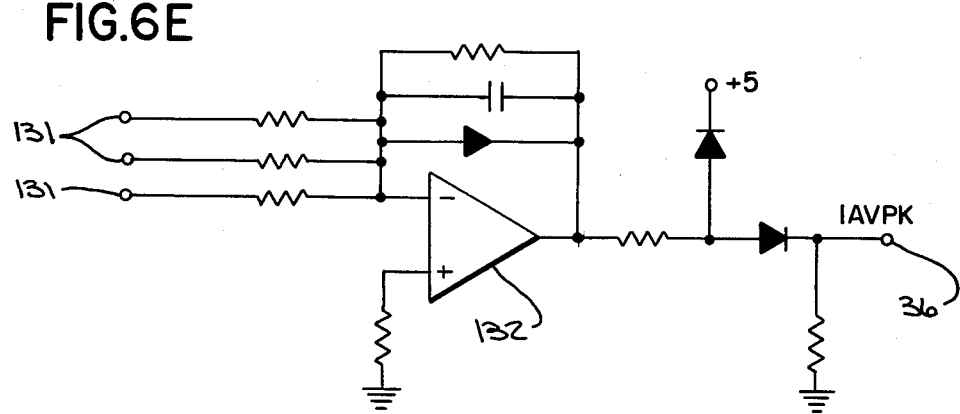
FIGS. 6A–6E are electrical schematic diagrams of the circuits contained in the RTD module which forms part of the system of FIG. 1.
Figure 6A:
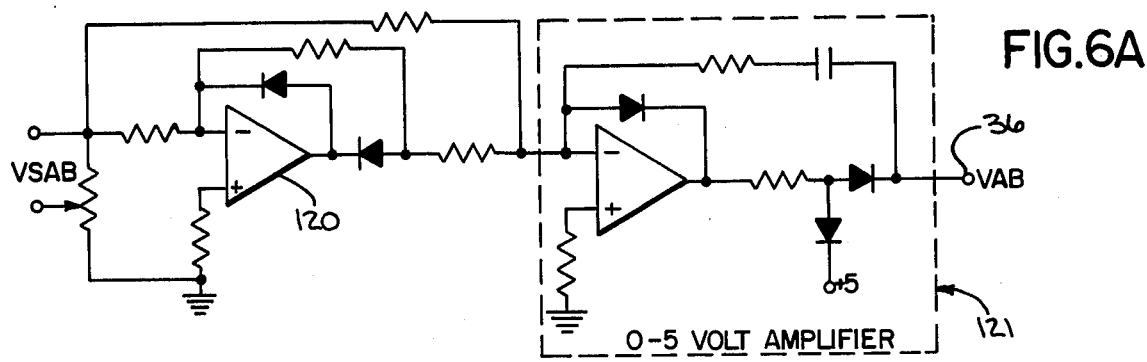
Figure 6B:
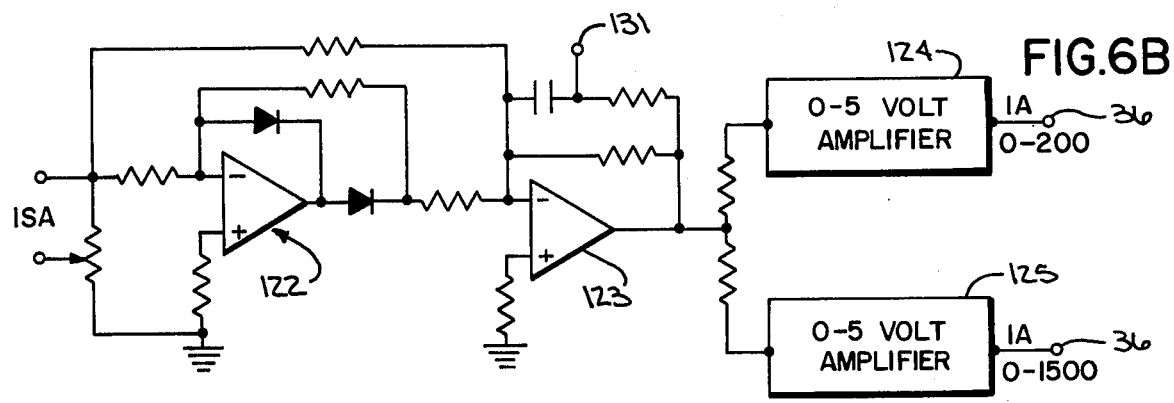
Figure 6C:
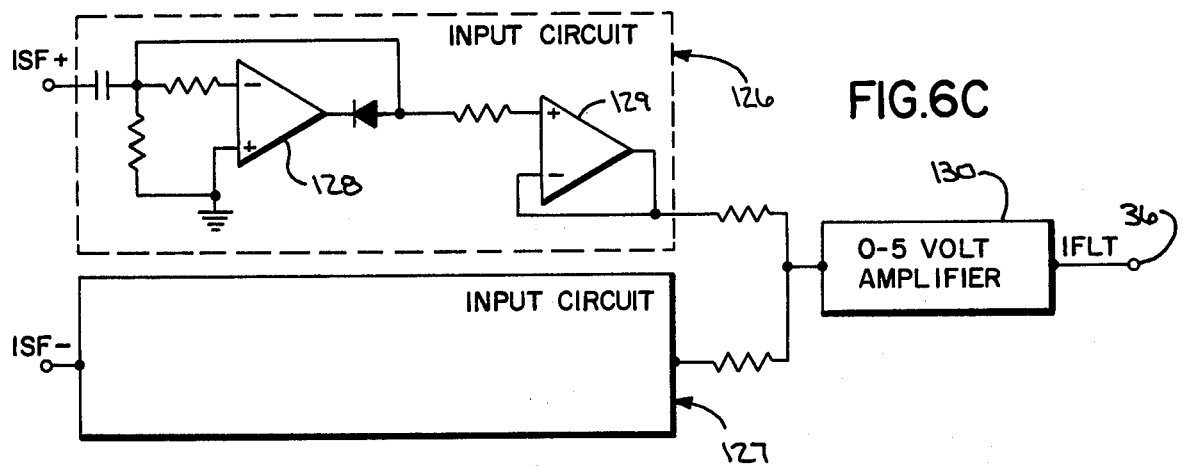

Referring particularly to FIGS. 6B and 6E, an analog signal indicative of the instantaneous motor current is applied to one channel of the analog multiplexer 35. This analog input signal is obtained by summing the separate phase current signals in an operational amplifier 132. The separate phase current signals are obtained from an output 131 of the phase current circuit of FIG. 6B, and the operation of the summing circuit is the same as the amplifier 121 described above. The output of amplifier 132 (IAVPK) is a zero to five volt analog signal which is suitable for application to the analog multiplexer 35.

Figure 7:
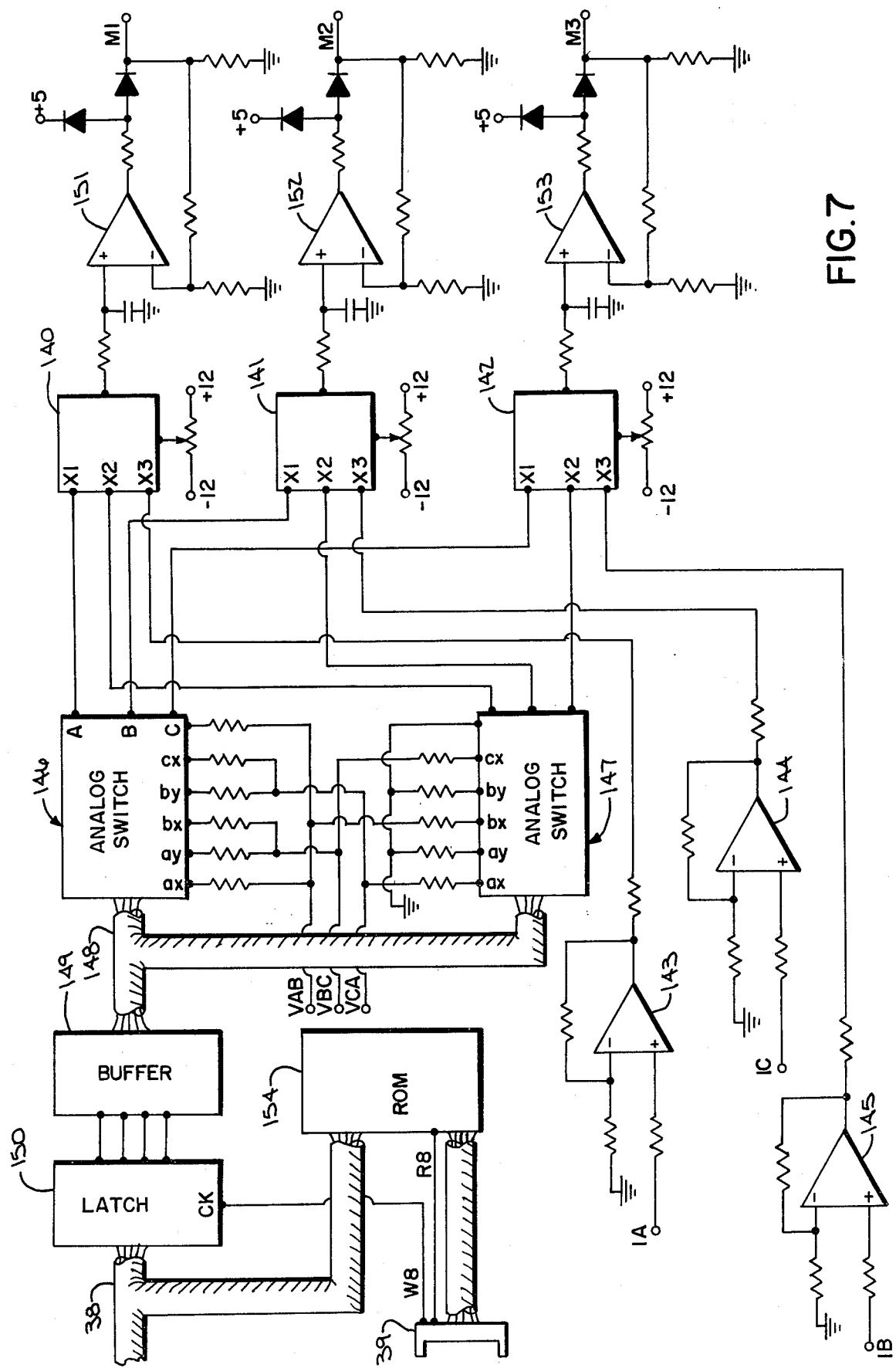
FIG. 7 is an electrical schematic diagram of an instrumentation circuit which connects to the protective module of FIG. 2.

Referring particularly to FIGS. 2A and 7, an instrumentation circuit is mounted within the protective module 1. The instrumentation circuit is contained on a separate circuit board and it connects to the backplane data bus 38 and the connector 39. The instrumentation circuit generates three analog signals M1, M2 and M3 which are applied to three inputs 36 on the analog-to-digital converter circuit 35. The instrumentation circuit is structured about three analog multiplier circuits 140, 141 and 142, and these receive analog input signals from three operational amplifiers 143, 144 and 145. The amplifiers 143–145 are driven by signals IA, IB and IC which are generated by the current input circuits (FIG. 6B). The signals IA, IB and IC indicate the magnitude of the motor phase currents and they are amplified and applied to the "Y1" inputs of the respective analog multiplier circuits 140–142.

The multipliers 140–142 also receive input signals from two analog switches 146 and 147. The three outputs (A, B, C) on the analog switch 146 connect to the respective "X1" inputs on multipliers 140–142 and the three outputs (A, B, C) on the analog switch 147 connect to the respective "X2" inputs. The inputs to the analog switches 146 and 147 are signals VAB, VBC and VCA generated by the voltage input circuits (FIG. 6A). By selecting the inputs on the analog switches 146 and 147 through a code on bus 148, the motor phase voltages (VAB, VBC, VCA) can be applied to any of the multipliers 140–142. The bus 148 is driven by a set of buffers 149 which receive a 4-bit code from a latch 150. The latch 150 is connected to the backplane data bus 38 and it is clocked by a control line W8 when the microprocessor 15 writes to the address (8000 H). The selection of phase voltages applied to the multipliers 140–142 is thus under the control of the microprocessor 15.

The output of each analog multiplier circuit 140–142 is an analog signal proportional to the product of its input signals $(X1-X2) \times (Y1)$. By selectively switching the input signals applied to their inputs, the signals generated by the multipliers 140–142 may be employed to measure a number of motor operating parameters, including power factor and power. Amplifier circuits containing operational amplifiers 151–153 connect to the outputs of the respective multipliers 140–142 and these provide analog signals of from zero to five volts on the respective leads M1, M2 and M3. These analog signals are applied to three inputs 36 on the analog-to-digital circuit 35 (FIG. 2) where they may be individually selected and converted to a digital number.

The programs which direct the microprocessor 15 in the operation of the instrumentation circuit are stored in a read-only memory (ROM) 154 which connects to the backplane data bus 38 and the connector 39. When the microprocessor 15 reads an instruction from the ROM 154 a control line R8 is driven low by the chip select circuit 40 and an 8-bit addressed word is read onto the bus 38 and into the microprocessor 15. It should be apparent that the instrumentation circuit of FIG. 7 is self-contained and may be offered as an optional feature to the user. All of the circuitry and the programs for operating the circuitry are contained on a single circuit board which plugs into the backplane bus in the protective module 1.

Figure 6D:
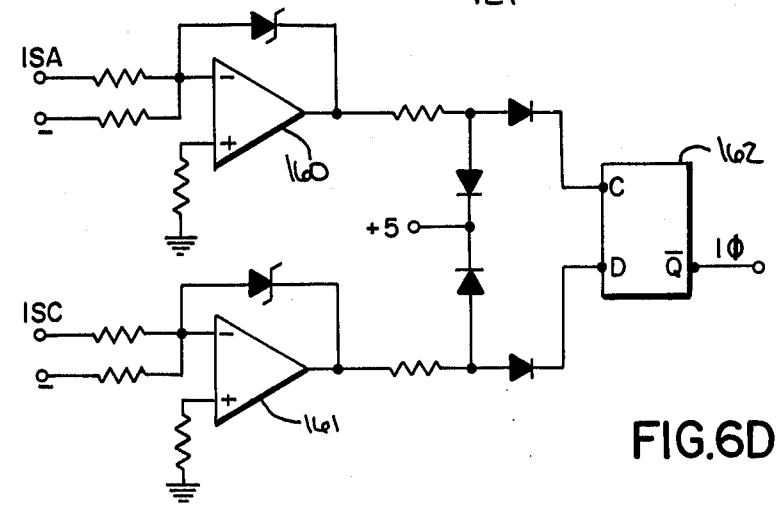

Referring particularly to FIGS. 6D and 2, in addition to the many analog signals which are input to the system, two single-bit digital signals (I$\phi$ and V$\phi$) are input directly to the microprocessor 15 through its terminals P10 and P11. These digital signals indicate if a phase reversal has occurred, and as shown in FIG. 6D with respect to the motor current phase signal I$\phi$, this is accomplished by applying two consecutive phase current signals (ISA and ISC) to respective operational amplifiers 160 and 161. The positive portion of each waveform ISA and ISC drives the amplifiers 160 and 161 into saturation and the resulting phase-displaced digital signals are applied to the C and D inputs of a D-type flip-flop 162. When the currents are in the proper phase, the $\overline{Q}$ output of the flip-flop 162 remains at a logic low voltage, and if they are out of phase, it is driven to a logic high voltage. An identical circuit to that shown in FIG. 6D generates the voltage phase signal V$\phi$ from the input signals VSCA and VSAB.

Figure 3:
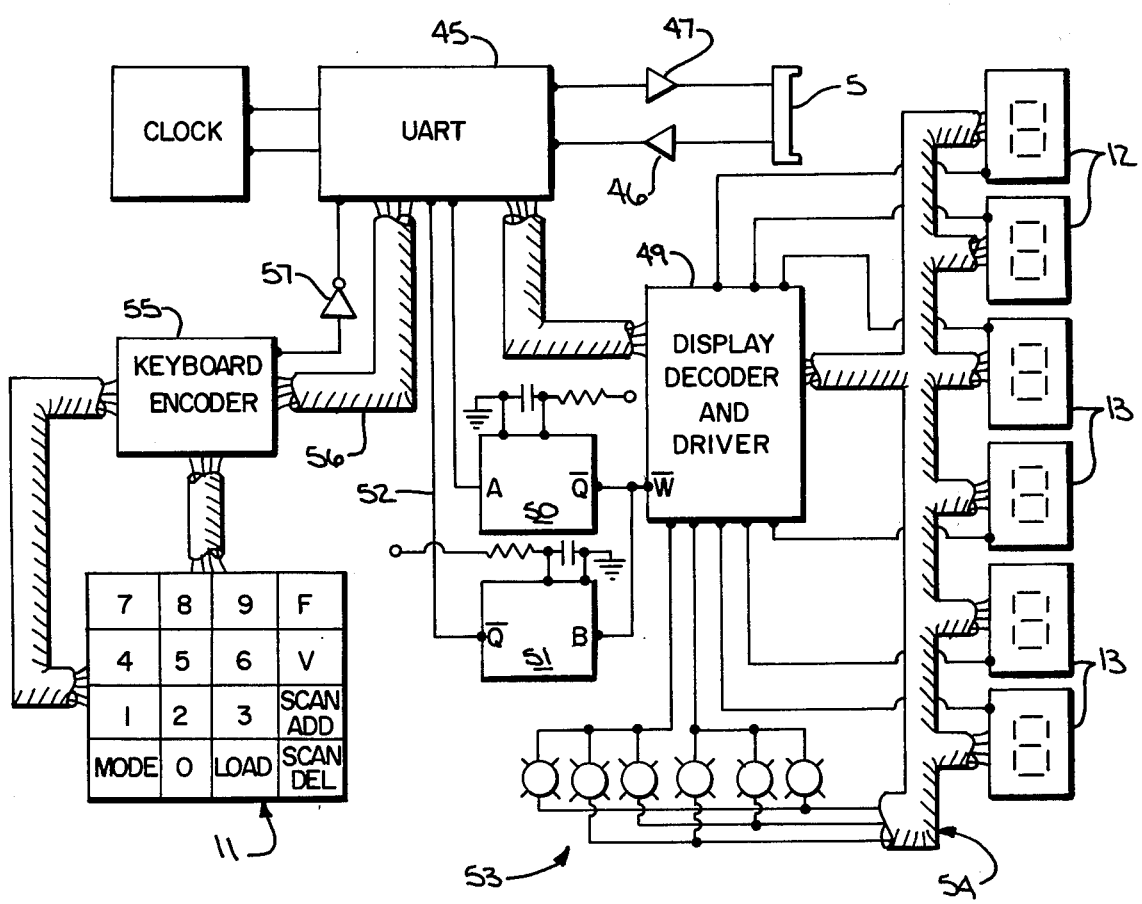
FIG. 3 is an electrical schematic diagram of the programmer module which forms part of the system of FIG. 1.

Referring particularly to FIGS. 1 and 3, the programmer module 4 includes a universal asynchronous receiver/transmitter (UART) 45 which has its serial input and output terminals coupled to the connector 5 by buffers 46 and 47. Seven data output terminals on the UART 45 connect through a bus 48 to the inputs of a display decoder and driver circuit 49. When a byte of data is received from the protective module 1 through the buffer 46, the UART 45 generates the seven most significant bits on the bus 48. The UART 45 also triggers a monostable multivibrator 50 and 500 nanoseconds later the seven bits are written into the display decoder and driver 49. A second monostable multivibrator 51 is also triggered, and one microsecond later a transfer acknowledge signal is applied to the UART 45 through control line 52.

Three of the data bits written to the display decoder and driver circuit 49 are decoded to select one of the six seven-segment displays 12 or 13 or one of the light emitting diodes 53. The remaining four bits are decoded and generated on a bus 54 to determine the character to be displayed or the particular light emitting diode 53 to be energized. The display decoder and driver 49 maintains the display devices 12, 13 and 53 in the indicated state until it receives another byte of data from the UART 45.

Referring still to FIG. 3, the programmer module keyboard 11 is a four-by-four switch matrix which has its eight output terminals connected to a keyboard encoder circuit 55. The four output terminals of the keyboard encoder 55 are connected to data input terminals on the UART 45 through a bus 56. When a key is depressed, a strobe signal is coupled through a gate 57 to load the keyboard data into the UART 45. A code corresponding to the depressed key is transmitted by the UART 45 through the buffer 47 to the protective module 1.

Referring particularly to FIG. 4, the RTD module 7 is structured around an 8-bit microprocessor 60. The microprocessor 60 includes an integral asynchronous receiver/transmitter that is coupled to the cable 8 by buffers 61 and 62, and under the direction of instruction stored in a read-only memory (ROM) 63, the microprocessor 60 provides full duplex serial communication with the protective module 1.

The microprocessor 60 drives an 8-bit data bus 64 and a 16-bit address bus 65. Eight of the address bus leads (A0–A7) eminate from an octal latch 66 which is loaded with the least significant address byte when an SC1 control line 67 is driven low. The microprocessor 60 also includes an 8-bit output port (P10–P17) which drives an output bus 68 through a set of buffers 69. The microprocessor 60 is programmed to output data on the bus 68 which selects one of eight channels on each of four analog multiplexer circuits 70–73. The microprocessor 60 is also programmed to input data from an 8-bit latch 74 and an analog-to-digital converter 75 which connect to the data bus 64.

Figure 5:
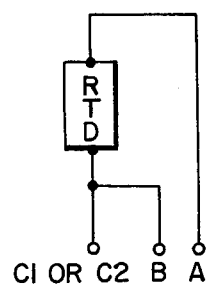
FIG. 5 is a schematic diagram which illustrates the connection of a resistance temperature detector (RTD) to the RTD module of FIG. 4.

The latch 74 has its eight inputs connected to a set of eight double-pole-single-throw switches 76. The switches 76 are set by the user to indicate the type of resistance temperature detectors (RTDs) that are employed to sense motor winding and bearing temperature. One pole on each of the eight switches 76 connects a latch input to circuit ground and the corresponding second pole connects an RTD return line C1 or C2 to circuit ground through one of four scaling resistors 77. The return line C1 is common to all six RTDs used to sense motor winding temperature and the return line C2 is common to the two RTDs used to sense bearing temperature. The connection of each RTD is shown in FIG. 5. The resistors 77 are chosen to provide compensation for 10 ohm copper, 100 ohm platinum, 100 ohm nickel or 120 ohm nickel RTDs. That is, their values are selected to equal the respective RTD resistances at −40 degree Celsius. By reading the contents of latch 74 when an enable line 78 is driven low, the system can determine the switch settings, and hence, the type of RTD chosen for the two applications.

The analog multiplexer 70 has an input which is connected to a constant current source 80. This constant current is output from the multiplexer 70 through one of eight resistors 81 to a bus A. The eight leads in the bus A connect to the respective RTDs as shown in FIG. 5. By outputting an appropriate 4-bit code on the output bus 68, the constant current generated by source 80 is directed by the multiplexer 70 to a selected one of the eight RTDs.

The same 4-bit code on the output bus 68 is also applied to the analog multiplexers 71 and 72 to enable the corresponding channel in each. The eight analog input terminals on the multiplexer 71 receive current through resistors 82 from the corresponding leads in the bus A. The multiplexer 71 generates an analog voltage at its output lead 83 which is indicative of the voltage drop which occurs across the selected resistor 82 due to the applied constant current. Similarly, the eight input terminals on the analog multiplexer 72 connect through resistors 84 to the eight leads in a bus B. The leads in bus B connect to the respective RTDs as shown in FIG. 5, and the analog output voltage generated by the multiplexer 72 on lead 85 is indicative of the voltage drop across the selected RTD. As will become more apparent from the description below, the microprocessor 60, under the direction of instructions in the ROM 63, sequentially applies current to each of the eight RTDs and measures the voltage drop across each. From this measurement the resistance of each RTD can be calculated and hence the temperature of its surroundings.

Referring still to FIG. 4, the analog output voltages generated on leads 83 and 85 are applied to the inputs of an instrumentation amplifier indicated by dashed lines 90. The output of the amplifier 90 is an analog signal which indicates the voltage drop across the selected RTD and this signal is applied to the input of the analog-to-digital converter 75. The instrumentation amplifier 40 includes a pair of operational amplifiers 91 and 92 which amplify the respective analog input signals and apply them to the differential inputs of an amplifier 93. The output of the amplifier 93 is applied to an inverting amplifier 94 which generates an analog output signal of from zero to five volts. The gain of the instrumentation amplifier 90 is controlled by the analog multiplexer 73 which has its input connected to the inverting input of amplifier 92. Six of the outputs of the multiplexer 73 connect through resistors 95 to the inverting input of amplifier 91 and one of these six resistors 95 is inserted into the circuit 90 to determine its gain. This selection, and hence the gain of the instrumentation amplifier 90, is controlled by a 4-bit code which is written to the multiplexer 73 by the microprocessor 60. Four of the resistors 95 are selected to provide the gain appropriate for each of the four types of RTDs which may be used, and two of the resistors 95 are selected to provide high resolution measurements for 100 ohm and 120 ohm nickel RTDs.

Referring still to FIG. 4, a chip select circuit 97 connects to the address bus 65 and is responsive to address data generated by the microprocessor 60 to enable various circuit elements. More specifically, the chip select circuit 97 drives a control line G low to read data from the ROM 63 and it drives the control line 78 low to read data from the latch 74. A control line 98 is driven low to sample the output of the instrumentation amplifier 90 and convert it to a digital number, and the analog-to-digital converter 75 is enabled through control line 99 to generate this digital number on the data bus 64. The microprocessor 60 may thus measure the resistance of any of the eight RTDs and convert those measurements to temperatures. These temperatures are coupled through the cable 8 to the protective module 1 where they are compared with the preset limits.

Figure 8A:
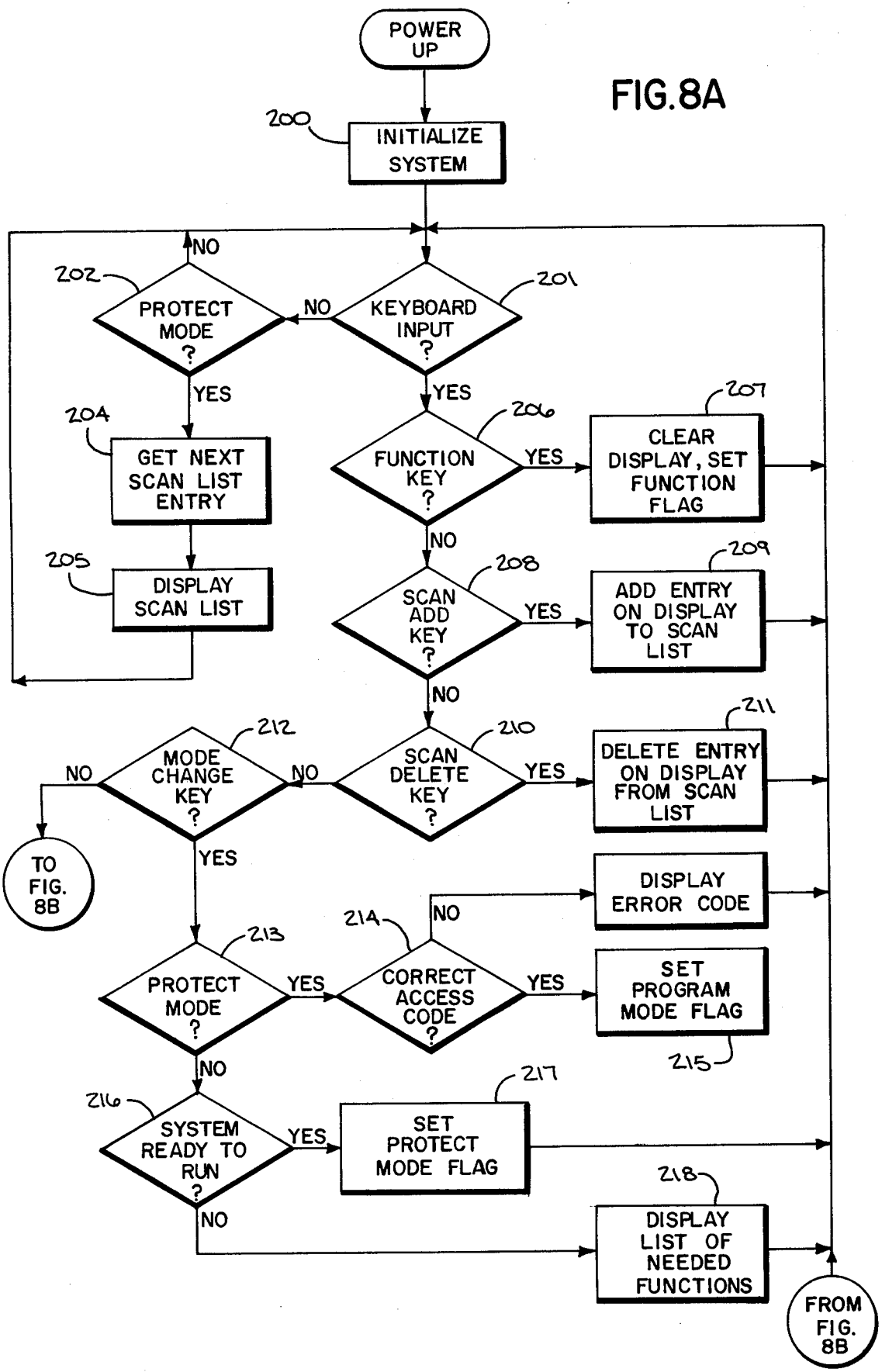

Referring particularly to FIGS. 2 and 8A the protective module 1 operates in response to instructions stored in the read-only memory 25. These instructions are read in sequence by the microprocessor 15 when power is applied to the protective module 1, and the microprocessor 15 executes each instruction to carry out the functions now to be described.

Referring particularly to FIG. 8A, after the module 1 is powered up, instructions indicated by process block 200 are executed to initialize the hardware elements of the system and its data structures. The UART 22 is then checked at decision block 201 to determine if a character has been received from the programming module keyboard 11. If so, the character is analyzed as will be described in detail below. Otherwise, an instruction indicated by process block 202 is executed to determine if the system is in the protect mode. If so, a function number is read from a scan list 203 in the RAM 26 as indicated by process block 204 and the value of the indicated function number is read from the input image table 242. This function number and value are output to the display on the programmable module 4 as indicated by process block 205. While the system is in the protect mode, the function numbers stored in the scan list 203 and their current values are sequentially displayed. Each entry is displayed for 3 to 10 seconds as programmed by the user (Function No. 33 in TABLE A) and when the end of the list is reached, the cycle repeats.

Referring still to FIG. 8A, when a character is entered by the user it is analyzed to determine the operation to be performed. If the "FUNCTION" key is depressed as detected at decision block 206, the displays 12 and 13 (FIG. 1) are cleared and a function flag is set as indicated at process block 207. If the "SCAN ADD" key is depressed as detected at decision block 208, the function number currently being displayed is added to the scan list 203. This is accomplished at process block 209 which writes the new function number into the RAM 26 at the end of the scan list 203. If the "SCAN DELETE" key is detected at decision block 210, the function number being displayed is deleted from the scan list 203 as indicated at process block 211. Thus, the scan list can be edited by the user by depressing the FUNCTION key, entering a two digit function number, and then depressing the SCAN ADD or SCAN DELETE key.

Referring still to FIG. 8A, when the "MODE" key is depressed as detected at decision block 212, the mode flag is checked at decision block 213 to determine the present mode of operation. If the system is in the protect mode, a change to the program mode is desired and the user must enter a four-digit access code to make this mode change. If the correct access code is entered, as determined at decision block 214, the mode flag is set to the program mode as indicated at process block 215. On the other hand, if a mode change is being made to the protect mode, a set of instructions indicated by decision block 216 are executed to determine if the system is in condition to operate. This is accomplished by reading the contents of the user entry table 213 stored in the RAM 26 to determine which functions have been initialized or entered, by the user. These are compared against a list of function members which must be initialized by the user before the motor is allowed to operate. If all required entries have been made, the protect mode flag is set as indicated by process block 217. Otherwise, the lowest function number requiring entry by the user is displayed at process block 218.

Figure 8B:
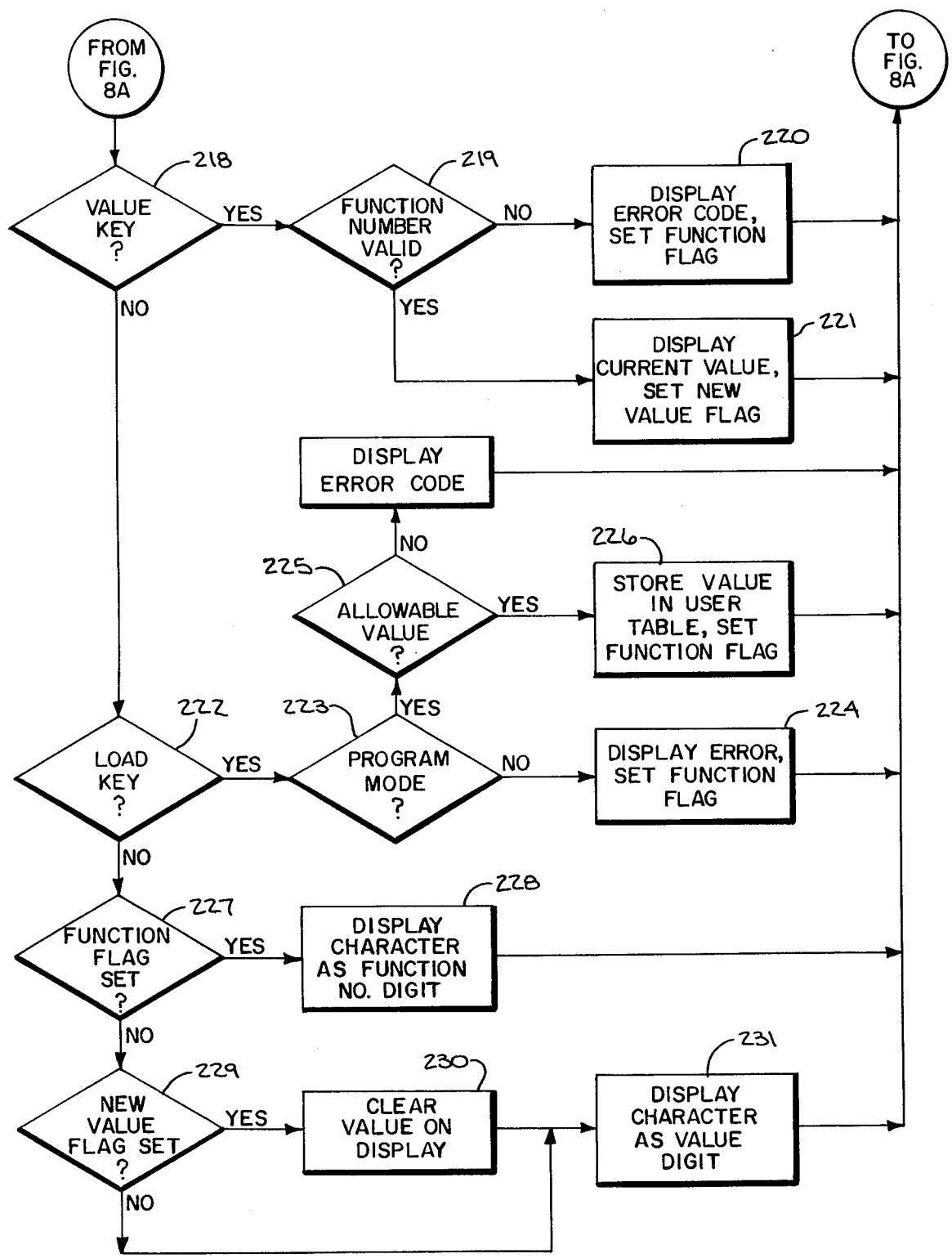

Referring particularly to FIGS. 1 and 8B, the "VALUE" key is depressed on the programmer module 4 after a two-digit function number is entered. This is detected at decision block 218, and as indicated by decision block 219, the function number currently displayed is checked to determine if it is valid. If not, the display is cleared, the display 13 will contain an error code, and the function flag is set as indicated at process block 220. If a valid function number has been entered the present value for the function number is read from the input image table 242 and displayed. As indicated at process block 221 the value flag is also set to indicate that any input digits which follow are value digits.

After the value digits are entered for a selected function the user depresses the "LOAD" key on the programmer module 4. This is detected at decision block 222 and the program mode flag is checked at decision block 223 to determine if changes are allowed. If not, an error indication is displayed and the function flag is set at process block 224. Otherwise, the new value currently on the display 13 is checked at 225 to determine if it is within the allowable range for the function on the display 12. If the value is allowable, it is stored in the user entry table 213 and the function flag is set as indicated at process block 226. Otherwise, an error code is displayed.

When a digit key is depressed by the user, either a function number or a value is being entered. If the function flag is set as determined at decision block 227, the digit is displayed as the least significant digit of the function number display 12, as indicated at process block 228. Otherwise, the digit is to be displayed as a value and the new value flag is checked at decision block 229. If set, the display 13 is cleared at process block 230 and the digit is displayed as the least significant digit on the display 13 as indicated at process block 231.

By entering values for the function numbers indicated in TABLE A, a user entry table 213 is created in the RAM 26. As will be described in more detail below, these user entries are compared with the measured motor operating parameters to determine if alarm or trip levels have been reached. As will become apparent from the description below, the actual monitoring of motor parameters and sensing of alarm or trip conditions is accomplished by a series of program modules which are executed during a 10 millisecond interrupt.

Figure 8C:
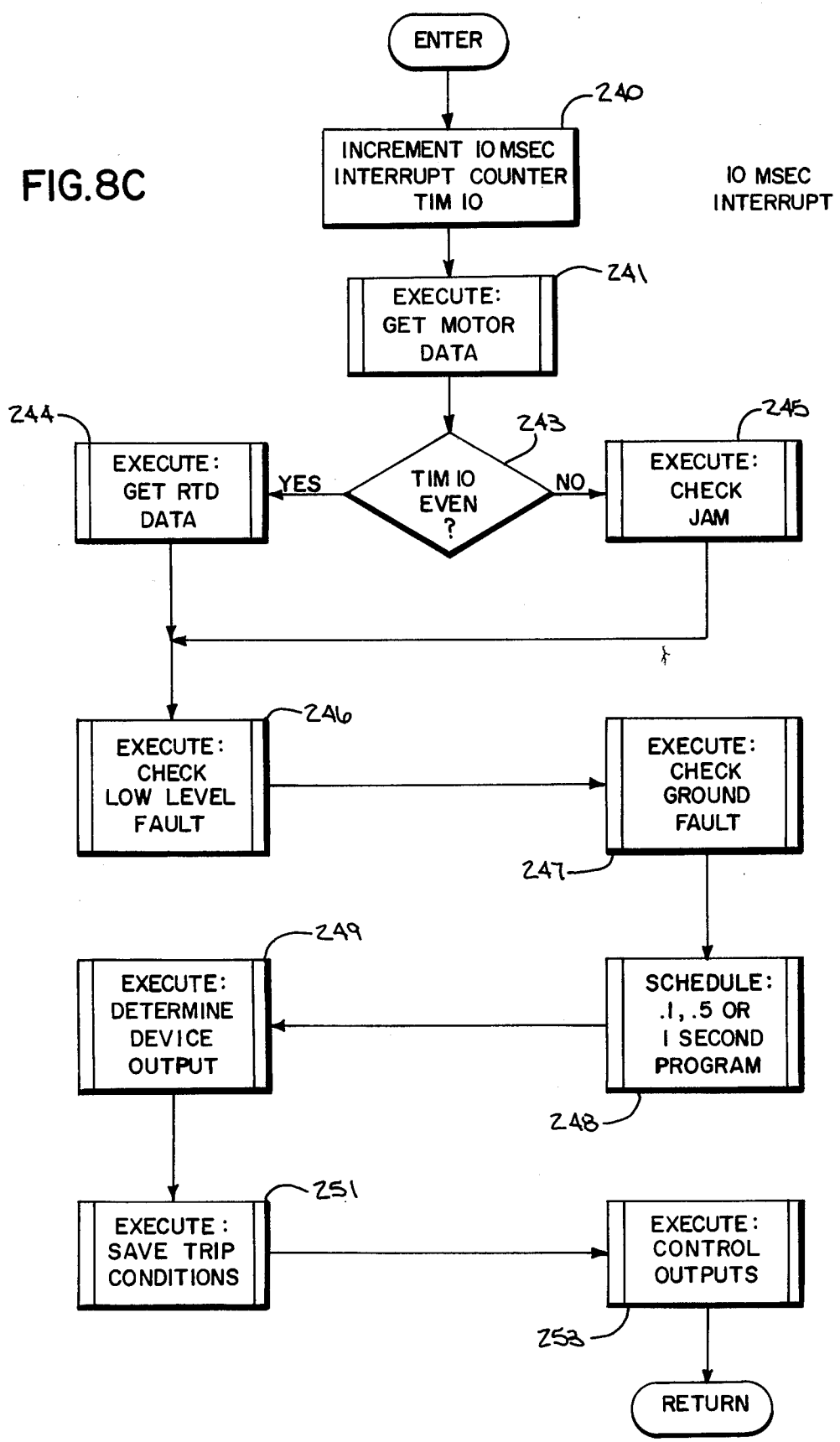

Referring particularly to FIG. 8C, the ten millisecond interrupt routine is executed every 10 milliseconds in response to an interrupt generated by the microprocessor's 15 internal clock. When executed, a 10 msec. interrupt counter (TIM10) is incremented by instructions indicated by process block 240. A series of subroutines are then called and execute to check the status of various motor operating parameters. Not all of the parameters are checked during each "scan", but instead, some are executed every other scan (20 milliseconds), every tenth scan (100 milliseconds), every fiftieth scan (500 milliseconds), or every one-hundredth scan (1 second). The counter TIM 10 is employed as a means for scheduling these subroutines as will now be described.

Referring still to FIG. 8C, a GET MOTOR DATA subroutine 241 is executed first during each 10 millisecond interrupt. As will be explained in more detail below, this subroutine 241 inputs motor operating parameters from the analog multiplexer and A/D converter 35 (FIG. 20) and updates a motor parameter image table 242 in the RAM memory 26. The counter TIM10 is then checked at decision block 243, and if it is even, a GET RTD DATA subroutine 244 is called. Otherwise, a CHECK JAM subroutine 245 is executed. The GET RTD DATA subroutine 244 controls the serial port which communicates with the RTD module 7 through the cable 8. It validates data received from the RTD module 7, requests retransmission when errors are detected, and generates an error message when consecutive errors are detected. The CHECK JAM subroutine 245 reads the value of the average current (FIG. 6E) and compares that with the "Jam Trip Current" limits entered by the user (Function 20 in TABLE A). A trip flag is set if the current is excessive and if the motor is not in a startup condition.

A subroutine 246 is executed next to determine if the instantaneous motor current is excessive. The instantaneous motor current is read from the image table 242 and compared with the full load current (Function 2 in TABLE A). If an overcurrent condition exists and it exceeds the overcurrent multiple (Function 19 in TABLE A), a trip flag is set. If the fault trip-inhibit entry (Function 21 in TABLE A) is enabled, a trip condition will not occur if line current is more than 6 times full-load current (Function 2 in TABLE A).

A subroutine 247 is executed next to determine if excessive ground fault current is present. The sensed ground fault current is read from the image table 242 and compared with the ground fault trip limit (Function 17 in TABLE A) and the ground-fault alarm limit (Function 16 in TABLE A). If either limit is exceeded, the ground fault trip delay entry (Function 18 in TABLE A) is checked. If the ground-fault has been present for the indicated time, a trip and/or alarm flag is set. If the fault trip-inhibit entry (Function 21 in TABLE A) is enabled, a trip condition will not occur if line current is more than 6 times full-load current (Function 2 in TABLE A).

Referring still to FIG. 8C, one of twelve separate subroutines is then executed as indicated by process block 248. Some of these subroutines are executed once every ten scans and others are executed less often. The counter TIM10 is employed along with a second counter TIM100 as a means for scheduling these subroutines. TABLE C is a list of these subroutines and the time intervals between their execution.

TABLE C

| Subroutine | Time Interval |
| --- | --- |
| Check Repeat Starts | 100 msec. |
| Check Overload | 100 msec. |
| Check Long Accel/stall | 100 msec. |
| Check Phase Reversal | 100 msec. |
| Check Phase Loss/Unbalance | 100 msec. |
| Check Underload | 500 msec. |
| Check Undervoltage | 500 msec. |
| Check Normal Current Overtemp | 500 msec. |
| Check Bearing Temp. | 500 msec. |
| Check User Data | 1 second |
| Update Scan Display | 1 second |
| Perform optional Functions such as instrumentation | 1 second |

Referring still to FIG. 8C, after one of the routines listed in TABLE C is executed the 10 millisecond interrupt routine calls a DETERMINE DEVICE OUTPUT subroutine, which is indicated by process block 249. As will be explained in more detail below, this subroutine examines any trip or alarm flags which have been set and it determines the appropriate states for the alarm relay 28 and trip relay 29. In addition, the subroutine 249 determines the proper state of ten of the annunciator LEDs 32. The subroutine 249 indicates the proper states of these output devices by setting bits in an output image table 250 which is stored in the RAM 26. TABLE D is a list of the conditions indicated by the annuniciator LEDs 32.

TABLE D

| |
| --- |
| 1 Motor Overload |
| 2 Instantaneous overcurrent |
| 3 Phase loss/Phase unbalance |
| 4 Phase Reversal |
| 5 Long Motor Acceleration |
| 6 Repeat starts |
| 7 Motor Underload |
| 8 Undervoltage Condition |
| 9 Normal Current/over temperature |
| 10 Bearing overtemperature |
| 11 Ground Fault |
| 12 Open RTD |
| 13 Protective mode |
| 14 Program mode |

TABLE D-continued

| |
| --- |
| 15 Jam |

After the subroutine 249 is executed a SAVE TRIP CONDITIONS subroutine 251 is executed. If a trip condition is indicated, the routine 251 transfers the contents of the input image table 242 and the output image table 250 to a diagnostic table 252 in the RAM 26. This data indicates the state of the motor at the moment the trip condition was sensed, and it is available through the programmer module 4 for diagnostic purposes (Functions 70–86 in TABLE A). A more detailed description of the SAVE TRIP CONDITIONS routine 251 is provided hereinafter.

The final routine in the 10 millisecond interrupt routine of FIG. 8C is a CONTROL OUTPUTS subroutine 253. This routine outputs image table 250 to the octal latches 33 and 34 (FIG. 2) to set the states of the annunciator LEDs 33. A listing of the CONTROL OUTPUTS subroutine 253 is provided in Appendix A.

As indicated above, the GET MOTOR DATA subroutine 241 is executed every 10 milliseconds. Referring particularly to FIGS. 8D and 2, this subroutine sequentially examines digital data input from selected channels of the analog multiplexer and A/D converter 35. Since there are sixteen channels and time is required for the A/D data conversion to occur for each channel, not all channels are input during a single 10 millisecond scan. At the beginning, the multiplexer status is checked to determine if data is available. If so, as determined at decision block 260, the instantaneous motor current data is input (FIG. 6E) and stored in the input image table 242 as indicated at process block 261. Control data is then output to the multiplexer 35 as indicated at 262 to select the ground fault current input (FIG. 6C) channel. The system then waits at decision block 263 for this data to become available and it then inputs the ground fault current data at process block 264 and stores it in the input image table 242.

Referring still to FIG. 8D, the input of the remaining multiplexer channels are rotated. That is, a single phase voltage (FIG. 6A) or phase current (FIG. 6B) or optional module (FIG. 7) is input during each scan and the selection is rotated by instructions indicated at process block 265. When the selected data becomes available, as indicated at decision block 266, the data is input and stored in the input image table 242, as indicated at 267. When all of the multiplexer channels have been read, a flag is set as indicated at process block 268 to alert other programs that the input image table 242 has been completely updated. And finally, control data is output to the multiplexer 35 to select the instantaneous motor current input channel as indicated by process block 269. Thus, when the GET MOTOR DATA routine is re-entered during the next ten millisecond interrupt, this data is available for immediate input as described above.

Figure 8E:
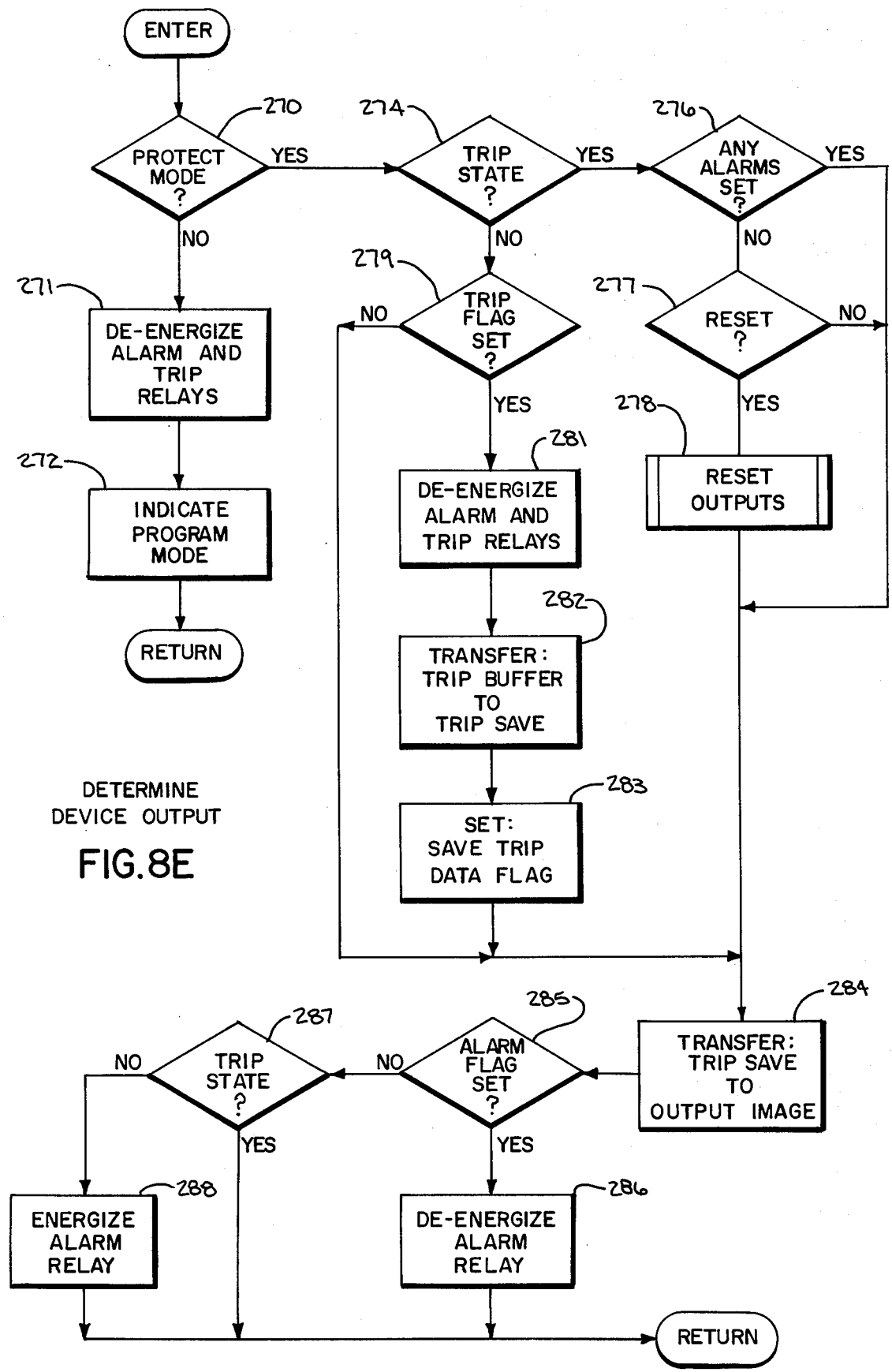

Referring particularly to FIG. 8E, the DETERMINE DEVICE OUTPUT subroutine 249 is executed every 10 milliseconds to control the states of the alarm and trip relays 28 and 29. When entered, the subroutine checks the mode flag at decision block 270 to determine if the system is in the protect mode. If not, the alarm and trip relays 28 and 29 are de-energized at process block 271 and the output image table 250 is placed in a state which indicates the program mode, as indicated at process block 272.

When the system is in the protect mode, a trip save buffer 273 in the RAM 26 is checked at decision block 274 to determine if the system is in the trip state. If it is, an alarm buffer 275 stored in the RAM 26 is examined at 276 to determine if any alarm conditions are present. If not a reset may occur and a reset input is checked at 277 to determine if a reset is to occur. If so, the system outputs are placed in their reset condition by a subroutine 278.

If the system is not in the trip state as determined at decision block 274, a test is made at decision block 279 to determine if a trip condition is present. This is accomplished by examining a trip buffer 280 stored in the RAM 26. The trip buffer 280 is comprised of two 8-bit words, with twelve of the bits corresponding to the motor fault conditions indicated at TABLE D. The subroutines which are executed during the 10 millisecond interrupt routine check these motor conditions and set the corresponding bit in the trip buffer 280 when a trip condition is found. When detected at decision block 279, the alarm and trip relays 28 and 29 are de-energized at process block 281 to indicate that a trip has occurred. In addition, the content of the trip buffer 280 is transferred to the trip save buffer 273 as indicated by process block 282, and a SAVE TRIP DATA flag is set as indicated by process block 283. The content of the trip save buffer 273 is then transferred to the output image table 250, as indicated by process block 284, to effect the state of the annunciation LEDS 32.

The alarm buffer 275 is then checked at decision block 285 to determine if any alarm conditions have been detected. As with the trip buffer 280, the alarm buffer is comprised of twelve bits which correspond to the twelve motor fault conditions listed in TABLE D. The subroutines which check these conditions will typically indicate an alarm condition when the parameter reaches 90% of the trip value. However, as indicated in TABLE A, alarm levels can be separately selected by the user for certain measured motor parameters. The alarm relay 28 is de-energized at process block 286 if any alarm limit is exceeded, otherwise, the trip save buffer 273 is examined at decision block 287 to determine if the system is already in the trip state. If not, the alarm relay 28 is energized at process block 288 to indicate normal operation.

The protective module 1 communicates with the RTD module 7 through the cable 8. This communication is accomplished serially with the protective module 1 sending a one-byte request for data to the RTD module 7 and the RTD module 7 responding with one byte of RTD data. The number of RTDs connected to the RTD module 7 can vary from 1 to 8, and as indicated in TABLE A, the user identifies the number of RTDs being used with appropriate entries made through the programmer module 4. As indicated above, when the protective mode is entered the GET RTD DATA subroutine 244 is called every 20 milliseconds to receive a byte of data from the RTD module 7 and to issue a request for further data.

Figure 8F:
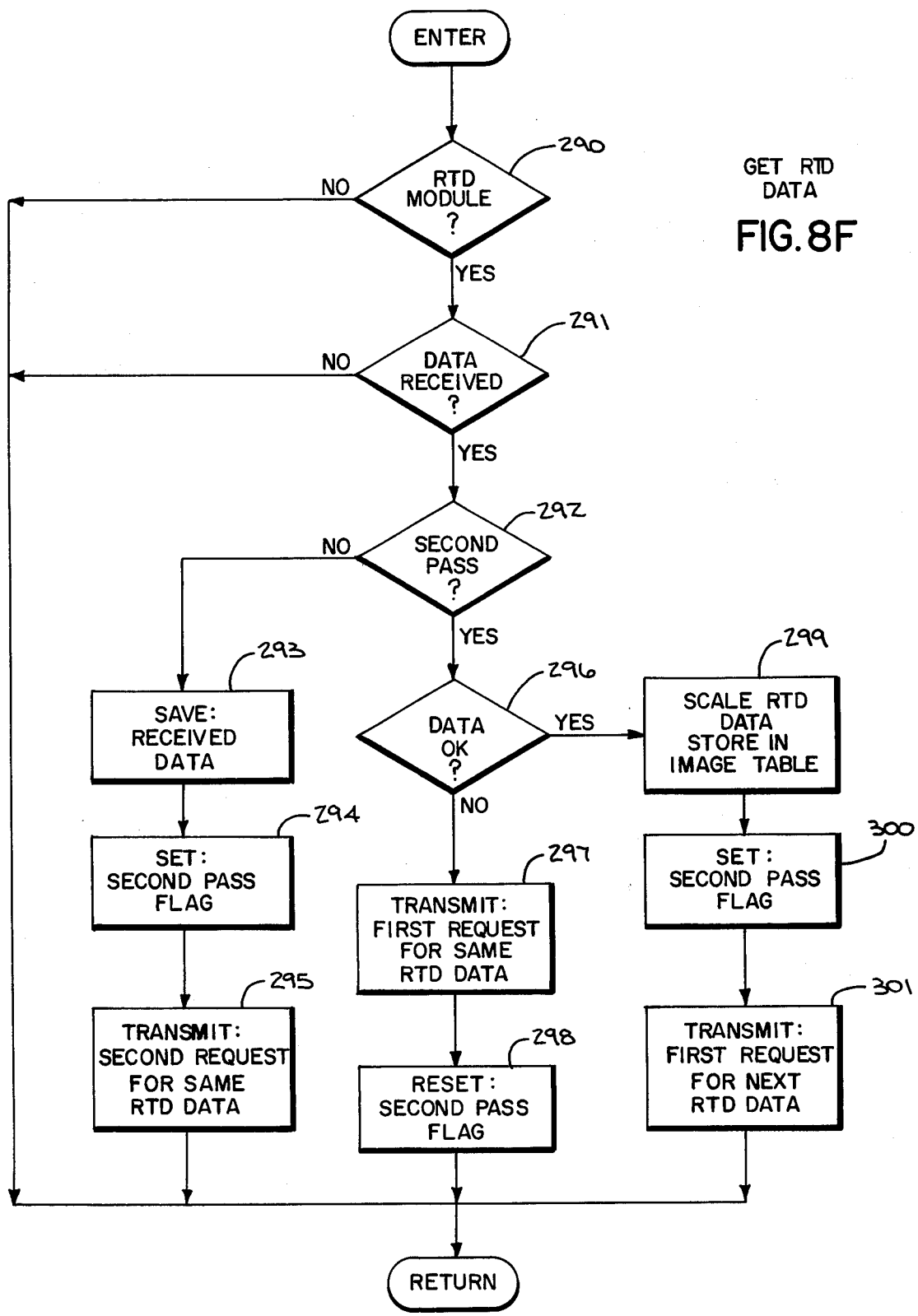

Referring particularly to FIG. 8F, the GET RTD DATA subroutine 244 includes instructions indicated by decision block 290 which determine if an RTD module 7 is connected. If not, the subroutine is exited, otherwise, the universal asynchronous receiver/transmitter within the microprocessor 15 is checked at decision block 291 to determine if a data byte has been received from the RTD module 7. In the preferred embodiment each RTD reading is transmitted twice to the protective module 1, and if a data byte is received a second pass flag is checked at decision block 292 to determine if this is the first or second transmission. The data received during the first transmission is saved in the RAM 26, as indicated by process block 293, and the second pass flag is then set as indicated by process block 294. A one-byte request for further data is then transmitted to the RTD module 7 as indicated by process block 295. This request indicates the number of the RTD which is to be read, and in this instance it is the same RTD indicated by the previous request.

When the second byte of data is received from the RTD module 7, as determined at decision block 292, it is compared with the data received during the first transmission. If the two bytes of data from the same RTD differ as determined at decision block 296, retransmission of the same data is requested. This is accomplished by requesting data from the RTD module 7 for the same RTD as indicated at process block 297, and by resetting the second pass flag as indicated at process block 298. When the data received in both transmissions compares favorably, the 8-bit binary number is scaled and stored in the input image table 242 as indicated at process block 299. The second pass flag is reset as indicated at 300 and then a request for data from the next RTD in the module 7 is made at process block 301. The process continues until data is input from all RTDs, and then the cycle repeats.

Figure 8G:
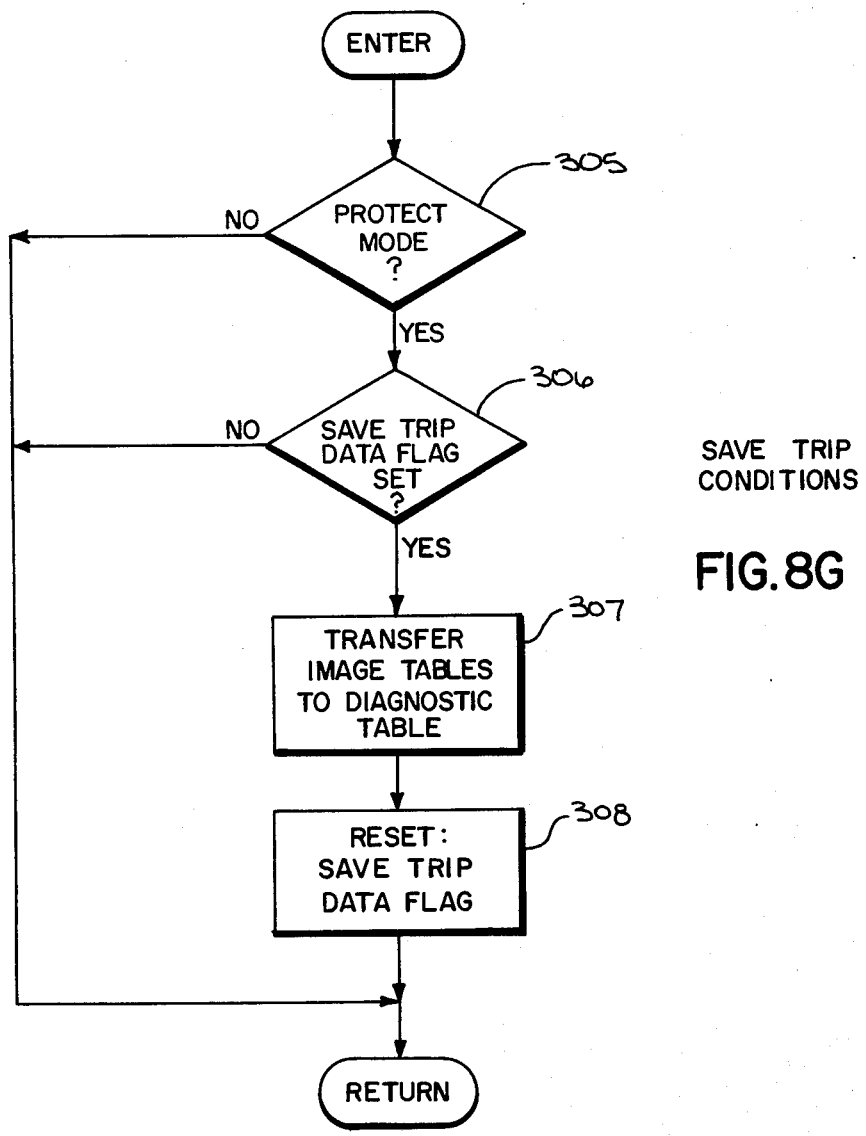

Referring particularly to FIGS. 8C and 8G, when a trip condition occurs the state of the system at the time of the trip is saved in the diagnostic table 252 of the RAM 26. This function is performed by the SAVE TRIP CONDITIONS subroutine 251 which is called from the 10 millisecond interrupt routine. When entered this subroutine 251 checks the system mode at decision block 305, and when in the protect mode, the save trip data flag is checked at decision block 206. If a trip has occurred during the current 10 millisecond scan, this flag is set and the data transfer is made. As indicated at process block 307, each data word in the input image table 242 and the output image table 250 is transferred to the diagnostic table 252. The save trip data flag is then reset at process block 308 and the subroutine is exited. The trip condition data is thus saved and may be accessed for diagnostic purposes by the user through the programmer module 4 (Functions 70-86 in TABLE A).

As described above in connection with FIG. 8C and TABLE C, a number of motor operating parameters are checked during each 10 millisecond interrupt. The subroutines which carry out these checks are very similar in structure and operation. They read the appropriate parameter value from the input image table 242 and compare it with the corresponding trip and alarm values stored in the user entry table 213. In some instances the alarm level is specified, while in other instances, other alarm value is a preset percentage of the specified trip value. A listing of the PHASE LOSS/PHASE UNBALANCE subroutine is provided in Appendix A and is representative of these subroutines. In addition, the operation of the CHECK GROUND FAULT subroutine 247 will now be described with reference to its flow chart in FIG. 8H.

When the CHECK GROUND FAULT subroutine 247 is entered the mode flag is checked and the system branches at decision block 310 if it is not in the protect mode. In such case, the alarm and trip indicators (bit 4 in the alarm buffer 275 and trip buffer 280) are cleared at process block 311 and the subroutine is exited. On the other hand, the measured value of the ground fault current (FIG. 6C) is read from the input image table 242 and compared with the alarm value (Function 16 in TABLE A) in the user entry table 213, as indicated at decision block 312. If an alarm condition is detected, bit 4 in the alarm buffer 275 is set at process block 313 and an alarm clear timer is set to 0.5 seconds at process block 314. If the alarm condition clears as detected at decision block 312, the alarm clear timer is checked at decision block 315 to determine if the ground fault current has remained below the alarm limit for 0.5 seconds. If so, the alarm indication in the alarm buffer 275 is cleared at process block 316, otherwise, the alarm clear timer is decremented 10 milliseconds at process block 317. As a consequence, when an alarm level is detected it is immediately indicated and must return below the alarm level for 0.5 seconds before the alarm indication is cleared.

Figure 8H:
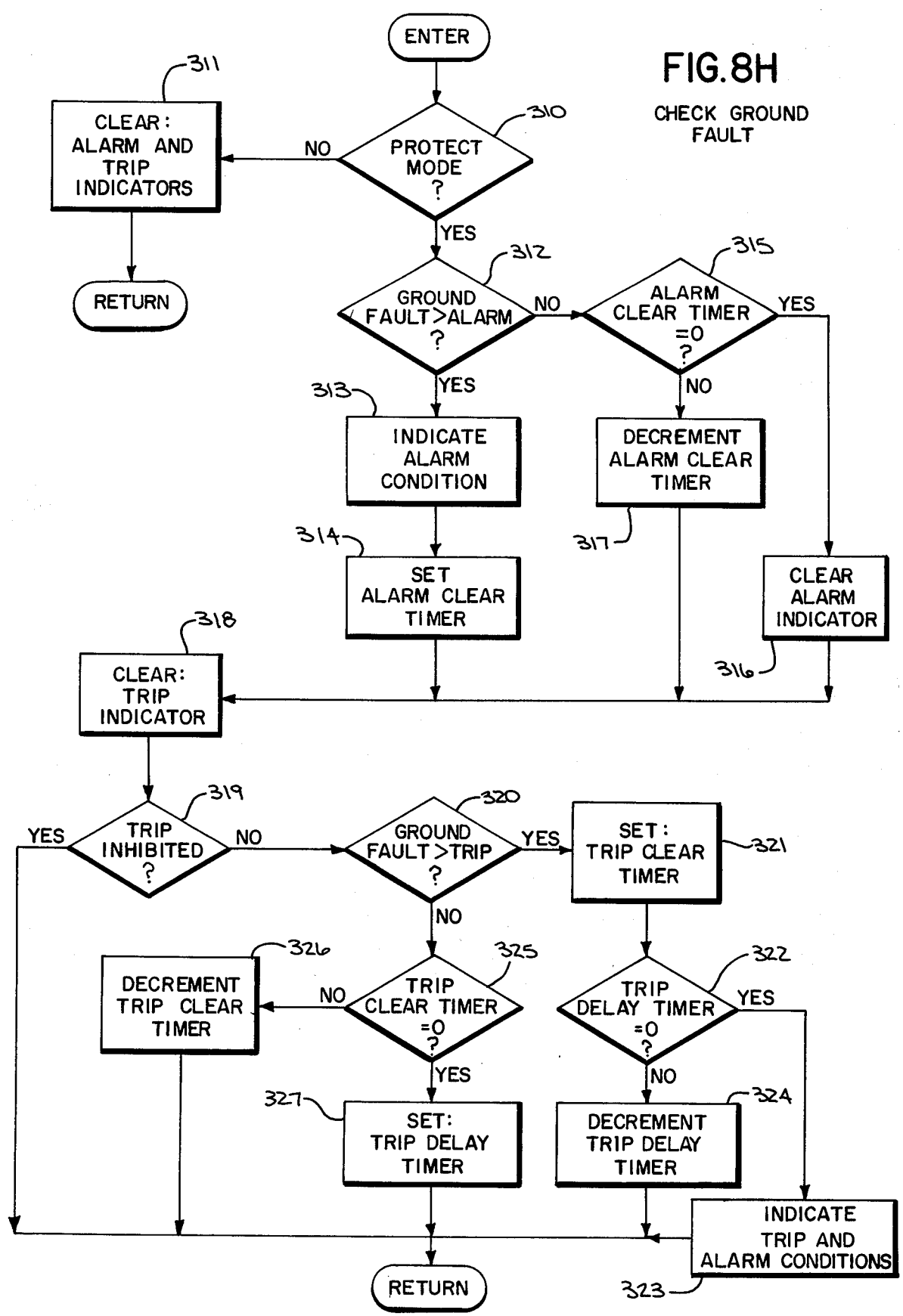

Referring still to FIG. 8H, after the alarm level has been checked the trip condition indicator (bit 4 in trip buffer 280) is cleared at process block 318 and the trip inhibit entry (Function 21 in TABLE A) is checked at decision block 319. If no trip is allowed the subroutine exits, otherwise, the measured value of the ground fault current is read from the input image table 242 and compared with the trip value (Function 17 in TABLE A) in the user entry table 213, as indicated at decision block 320. If a trip condition is detected a trip clear timer is set to 0.5 seconds at process block 321 and the value of a trip delay counter is checked at decision block 322. The trip delay timer is preset to a value selected by the user (Function 18 in TABLE A) and when it expires, a trip and alarm condition is indicated at process block 323. Otherwise, the trip delay timer is decremented 10 milliseconds at process block 324.

When a ground fault trip level is not present as determined at decision block 320, the trip clear timer is checked at decision block 325 to determine if it has expired. If not, the trip clear timer is decremented 10 milliseconds at process block 326, otherwise, the trip delay timer is set at process block 327 to the value indicated in the user entry table 213. A trip indication can only be cleared by manually resetting the system after the trip clear timer has timed out.

Referring particularly to FIGS. 4 and 9, the microprocessor 60 in the RTD module 7 executes a program stored in the ROM 63 to monitor the RTDs which mount in the motor being protected. At power-up, instructions indicated by process block 340 are executed to read the latch 74 and determine the type of RTD (copper, platinum or nickel) used on the motor windings and motor bearings. This data is employed to determine the proper calculations required to convert RTD readings to temperature. The RTD module 7 then awaits receipt of an initialization command from the protect module 1 through the serial cable 8. This command indicates the number of motor winding RTDs and the number of bearing RTDs which are being used and it sets up a schedule as indicated at process block 341.

After initialization is complete the RTD module 7 continuously monitors each RTD and maintains an up-to-date table of RTD temperatures in the random access memory within the microprocessor 60. Instructions indicated at decision block 342 are executed to determine if a command byte has been received from the protect module 1. If not, the RTD module hardware is operated to take the temperature reading of the next RTD on the schedule as indicated at process block 343. The value is input from the A/D converter 75 and converted into a number indicative of RTD temperature. This temperature is stored in the RTD table as indicated at process block 344, and the system loops to check for a new command. When a command is received from the protect module 1 as determined at decision block 342, the RTD number is extracted from the command and employed to read the corresponding RTD temperature as indicated at process block 345. This single byte binary number is output to the protect module 1 through the serial cable 8 as indicated at process block 346. The RTD module 7 thus maintains a table of current RTD temperatures and when a request is made by the protect module 1, the selected RTD temperature is quickly provided. As indicated previously, two transmissions are made of each RTD temperature reading to insure accuracy.

| APPENDIX A | | | |
|---|---|---|---|
| | | | CONTROL OUTPUTS SUBROUTINE |
| CTRLOT | COM | OUTBF1 | ;COMPLEMENT OUTPUT |
| | COM | OUTBF2 | ;IMAGE TABLE 250 |
| | LDD | OUTBF1 | ; |
| | STA A | LEDB1 | ;OUTPUT TABLE 250 |
| | STA B | LEDB2 | ;TO LATCHES 33 and 34 |
| | RTS | | ;RETURN |
| | | | CHECK PHASE LOSS/UNBALANCE |
| PHUNBL | LDA A | #0BFH | ;INDICATE NO TRIP CONDITION. |
| | AND A | TRPBF1 | ; |
| | STA A | TRPBF1 | ; |
| | TST | MODEF | ;IS DEVICE IN PROTECTIVE MODE? |
| | BEQ | PU16J | ;NO,GOTO PU16. |
| | JSR | PHASEL | ;YES,CHECK PHASE LOSS. |
| | LDA A | #40H | ;DID PHASE LOSS TRIP OCCUR? |
| | BIT A | TRPBF1 | ; |
| | BEQ | PU1 | ;NO,GOTO PU1. |
| | JMP | PU17 | ;YES,GOTO PU17. |
| PU1 | TST | UNBAL | ;IS PHASE UNBALANCE ENABLED? |
| | BEQ | PU15J | ;NO,GOTO PU15. |
| | LDD | IFAULT | ;YES,DOES MOTOR CURRENT EXIST? |
| | BEQ | PU14J | ;NO,GOTO PU14. |
| | LDD | FLA | ;YES,COMPUTE 200% OF MOTOR FULL LOAD CURRENT |
| | ASLD | | ; |
| | STD | ITEMP0 | ;move to ix. |
| | LDX | ITEMP0 | ; |
| | CLR A | | ;clear phase count. |

-continued

APPENDIX A

| | | | |
|---|---|---|---|
| | CPX | IA | ;ARE TWO LINE CURRENTS <200% FLA? |
| | BLS | PU2 | ;phase a is not,goto pu2. |
| | INC A | | ;phase a is,increment phase count. |
| PU2 | CPX | IB | ; |
| | BLS | PU3 | ;phase b is not,goto pu3. |
| | INC A | | ;phase b is,increment phase count. |
| PU3 | CPX | IC | ; |
| | BLS | PU4 | ;phase c is not,goto pu4. |
| | INC A | | ;phase c is,increment phase count. |
| PU4 | CMP A | #1 | ;is more than 1 phase <200% fla? |
| | BLS | PU13J | ;NO,GOTO PU13. |
| | JSR | UNBMAG | ;COMPUTE MAGNITUDE OF PHASE UNBALANCE. |
| | CLR A | | ;clear ms. |
| | LDA | UNBAL | ;COMPUTE ALARM LEVEL AT 90% OF TRIP SETTING. |
| | LDX | #0E666H | ; |
| | JSR | MUL16 | ; |
| | JSR | RMUL16 | ;ROUND TO NEAREST INTEGER. |
| | STD | ITEMP0 | ;move to ix. |
| | LDX | ITEMP0 | ; |
| | CPX | ITEMP4 | ;IS UNBALANCE >= ALARM LEVEL? |
| | BHI | PU5 | ;NO,GOTO PU5. |
| | LDA A | #40H | ;YES,INDICATE AN ALARM CONDITION |
| | ORA A | ALMBF1 | ; |
| | STA A | ALMBF1 | ; |
| | LDA A | #0AH | ;LOAD ALARM-CLEAR DELAY TIMER FOR 1 SEC. DELAY. |
| | STA A | PUACDT | ; |
| | BRA | PU7 | ;GOTO PU7. |
| PU16J | JMP | PU16 | ; |
| PU15J | JMP | PU15 | ; |
| PU14J | JMP | PU14 | ; |
| PU13J | JMP | PU13 | ; |
| PU5 | TST | PUACDT | ;IS ALARM-CLEAR DELAY TIMER EXPIRED? |
| | BNE | PU6 | ;NO,GOTO PU6. |
| | LDA A | #0BFH | ;YES,INDICATE NO ALARM CONDITION. |
| | AND A | ALMBF1 | ; |
| | STA A | ALMBF1 | ; |
| | BRA | PU7 | ;GOTO PU7. |
| PU6 | DEC | PUACDT | ;DECREMENT ALARM-CLEAR DELAY TIMER. |
| PU7 | LDA B | UNBAL | ;set unbal (trip level). |
| | CLR A | | ;clear ms. |
| | STD | ITEMP0 | ;move unbal (trip level) to ix. |
| | LDX | ITEMP0 | ; |
| | CPX | ITEMP4 | ;IS UNBALANCE >= TRIP LEVEL? |
| | BHI | PU11 | ;NO,GOTO PU11. |
| | LDA A | #0AH | ;YES, LOAD TRIP-CLEAR DELAY TIMER FOR 1 SEC. |
| | STA A | PUTCDT | ; |
| | TST | PUTPDT | ;IS TRIP DELAY EXPIRED? |
| | | | ;or wrapped around zero? |
| | BGT | PU8 | ;NO,GOTO PU8. |
| | LDA A | #40H | ;YES, INDICATE TRIP CONDITION. |
| | ORA A | TRPBF1 | ; |
| | STA A | TRPBF1 | ; |
| | BRA | PU17 | ;GOTO PU17. |
| PU8 | CLR A | | ;clear ms. |
| | LDA B | UNBAL | ;COMPUTE 150% OF UNBALANCE TRIP LEVEL. |
| | LSR B | | ; |
| | ADD B | UNBAL | ; |
| | BCC | PU9 | ;carry to ms. ?...no,goto pu9. |
| | INC A | | ;yes,carry to ms. |
| PU9 | STD | ITEMP0 | ;move 150% to ix. |
| | LDX | ITEMP0 | ; |
| | CPX | ITEMP4 | ;IS UNBALANCE >150% OF TRIP LEVEL? |
| | BHS | PU10 | ;NO,GOTO PU10. |
| | DEC | PUTPDT | ;YES,DECREMENT TRIP DELAY TWICE. |
| | DEC | PUTPDT | ; |
| | BRA | PU17 | ;GOTO PU17. |
| PU10 | DEC | PUTPDT | ;DECREMENT TRIP DELAY ONCE. |
| | BRA | PU17 | ;GOTO PU17. |
| PU11 | TST | PUTCDT | ;IS TRIP-CLEAR DELAY TIME EXPIRED? |
| | BNE | PU12 | ;NO,GOTO PU12. |
| | LDA A | #28H | ;YES,RESET TRIP-DELAY TIMER. |
| | STA A | PUTPDT | ; |
| | BRA | PU17 | ;GOTO PU17. |
| PU12 | DEC | PUTCDT | ;DECREMENT TRIP-CLEAR DELAY TIMER. |
| | BRA | PU17 | ;GOTO PU17. |
| PU13 | LDA A | #0BFH | ;INDICATE NO ALARM CONDITION. |
| | AND A | ALMBF1 | ; |
| | STA A | ALMBF1 | ; |
| | LDA A | #28 | ;RESET PHASE UNBALANCE TRIP DELAY TIMER. |

APPENDIX A -continued

```
          STA A    PUTPDT    ;
          BRA      PU17      ;GOTO PU17.
PU14      LDA A    #0BFH     ;INDICATE NO ALARM CONDITION.
          AND A    ALMBF1    ;
          STA A    ALMBF1    ;
          LDA A    #28       ;RESET PHASE UNBALANCE TRIP DELAY TIMER.
          STA A    PUTPDT    ;
          BRA      PU17      ;GOTO PU17.
PU15      LDA A    #0BFH     ;INDICATE NO ALARM CONDITION.
          AND A    ALMBF1    ;
          STA A    ALMBF1    ;
          BRA      PU17      ;GOTO PU17.
PU16      LDA A    #0BFH     ;INDICATE NO ALARM CONDITION.
          AND A    ALMBF1    ;
          STA A    ALMBF1    ;
PU17      RTS                ;RETURN FROM SUBROUTINE.
                   ;
                   ;
                   ;
END
```

I claim:

1. A programmable motor protector, the combination comprising:
   means for storing an input image table;
   means coupled to the motor for periodically reading the values of motor operating parameters and storing the values in the input image table storage means;
   means for storing a diagnostic table;
   means for storing a user entry table;
   programmer means for entering values into the user entry table storage means which are indicative of trip levels for motor operating parameters;
   trip means for indicating a trip condition when enabled;
   comparator means coupled to the trip means and being operable to periodically compare values in the input image table storage means with corresponding trip level values in the user entry table storage means, and being operable to enble the trip means when a trip level is exceeded; and
   transfer means coupled to the trip means for transferring values in the input image table storage means to the diagnostic table storage means when the trip means is enabled.

2. The programmable motor protector as recited in claim 1 in which the programmer means includes a display, and in response to the entry of a request, a value stored in the diagnostic table storage means is coupled to the display.

3. The programmable motor protector as recited in claim 2 which includes scan list storage means for storing a list of numbers which identify motor operating parameter values stored in the input image table storage means, and display means for sequentially reading motor operating parameter values indicated in the scan list storage means and coupling each value to the display.

4. A programmable motor protector, the combination comprising:
   an RTD module which includes
   (a) a first set of input circuits connected to resistance temperature detectors mounted in the motor to be protected;
   (b) a first communication link for receiving command data and transmitting responsive RTD data;
   (c) first processor means which is responsive to command data received by the first communication link for reading RTD data from a selected one of the input circuits and coupling this RTD data to the first communication link for transmission;
   a protect module which includes:
   (d) a second communication link coupled to the first communication link for transmitting command data and receiving responsive RTD data;
   (e) A second set of input circuits coupled to sensors in the motor for sensing the value of motor operating parameters;
   (f) input image table storage for storing RTD values and motor operating parameter values;
   (g) user entry table storage for storing trip values corresponding to the RTD values and motor operating parameter values;
   (h) second processor means coupled to the second communication link and the second set of input circuits, the second processor means being operable: to periodically input motor operating parameter values from the second set of input circuits and store them in the input image table storage; to periodically generate command data to the second communication link requesting RTD data from the first set of input circuits and storing the responsive RTD data received by the second communication link in the input image table storage; and to periodically compare values in the input image table storage with corresponding trip values in the user entry table storage and to indicate a trip condition when one of the trip values is exceeded.

5. The programmable motor protector as recited in claim 4 in which the protect module includes a third communication link coupled to the second processor means and it includes a programmer module which communicates with the third communication link for entry of trip values, and the second processor is operable in response to trip value data received at the third communication link for storing the trip value data in the user entry table storage.

6. The programmable motor protector as recited in claim 5 in which the first, second and third communications links are serial communications links.

* * * * *